(12) United States Patent
Ozawa

(10) Patent No.: US 10,241,363 B2
(45) Date of Patent: Mar. 26, 2019

(54) LENS ARRAY SUBSTRATE, METHOD OF MANUFACTURING LENS ARRAY SUBSTRATE, ELECTRO-OPTICAL DEVICE, AND ELECTRONIC APPARATUS

(71) Applicant: Seiko Epson Corporation, Tokyo (JP)

(72) Inventor: Norihiko Ozawa, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 117 days.

(21) Appl. No.: 15/450,760

(22) Filed: Mar. 6, 2017

(65) Prior Publication Data

US 2017/0176812 A1 Jun. 22, 2017

Related U.S. Application Data

(63) Continuation of application No. 14/718,939, filed on May 21, 2015, now Pat. No. 9,618,787.

(30) Foreign Application Priority Data

Jun. 6, 2014 (JP) ................................ 2014-117366

(51) Int. Cl.
*G02F 1/13* (2006.01)
*G02F 1/1335* (2006.01)
*G02B 3/00* (2006.01)

(52) U.S. Cl.
CPC ..... *G02F 1/133526* (2013.01); *G02B 3/0006* (2013.01); *G02B 3/0012* (2013.01);
(Continued)

(58) Field of Classification Search
None
See application file for complete search history.

(56) References Cited

U.S. PATENT DOCUMENTS 5,337,186 A 8/1994 Oikawa
2003/0197210 A1* 10/2003 Uchida ............... G02B 3/0012
257/294

(Continued)

FOREIGN PATENT DOCUMENTS

JP 2003-084276 A 3/2003
JP 2007-226075 A 9/2007

(Continued)

OTHER PUBLICATIONS

Notice of Allowance and Notice of Allowability received in U.S. Appl. No. 14/718,939, dated Nov. 30, 2016.

*Primary Examiner* — James A Dudek
(74) *Attorney, Agent, or Firm* — ALG Intellectual Property, LLC

(57) ABSTRACT

A lens array substrate includes a substrate with a concave portion provided in a first face thereof, and a lens layer having a substantially flat surface provided to cover the first face and fill the concave portion. The lens layer includes a first layer and a second layer which are sequentially laminated from a substrate side by reflecting the shape of the concave portion therein. A refractive index of the first layer is different from a refractive index of the second layer. The second layer, the first layer, and the second layer are sequentially exposed to the surface of the lens layer in this order in a first direction in a plan view. The second layer, the first layer, the substrate, the first layer, and the second layer are sequentially exposed to the surface of the lens layer in this order in a second direction that intersects the first direction.

15 Claims, 11 Drawing Sheets

(52) U.S. Cl.
CPC ......... *G02B 3/0037* (2013.01); *G02B 3/0087* (2013.01); *G02F 2201/38* (2013.01)

(56) References Cited

U.S. PATENT DOCUMENTS

| | | | |
|---|---|---|---|
| 2009/0225435 A1 * | 9/2009 | Boettiger | B29D 11/00365 359/652 |
| 2012/0320288 A1 | 12/2012 | Baek et al. | |
| 2013/0070577 A1 | 3/2013 | Suzuki et al. | |

FOREIGN PATENT DOCUMENTS

| | | |
|---|---|---|
| JP | 2013-003588 A | 1/2013 |
| JP | 2013-065363 A | 4/2013 |

* cited by examiner

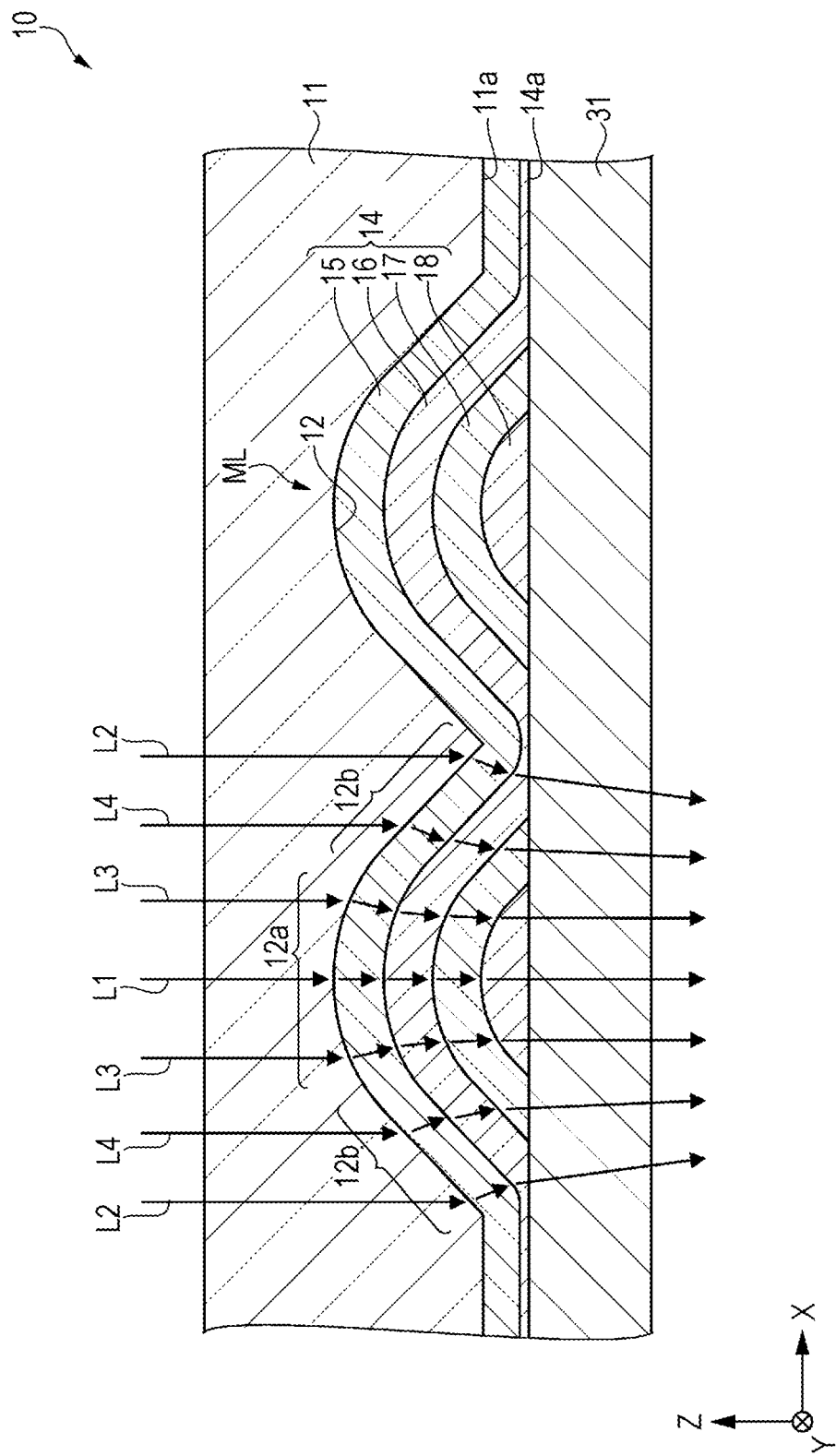

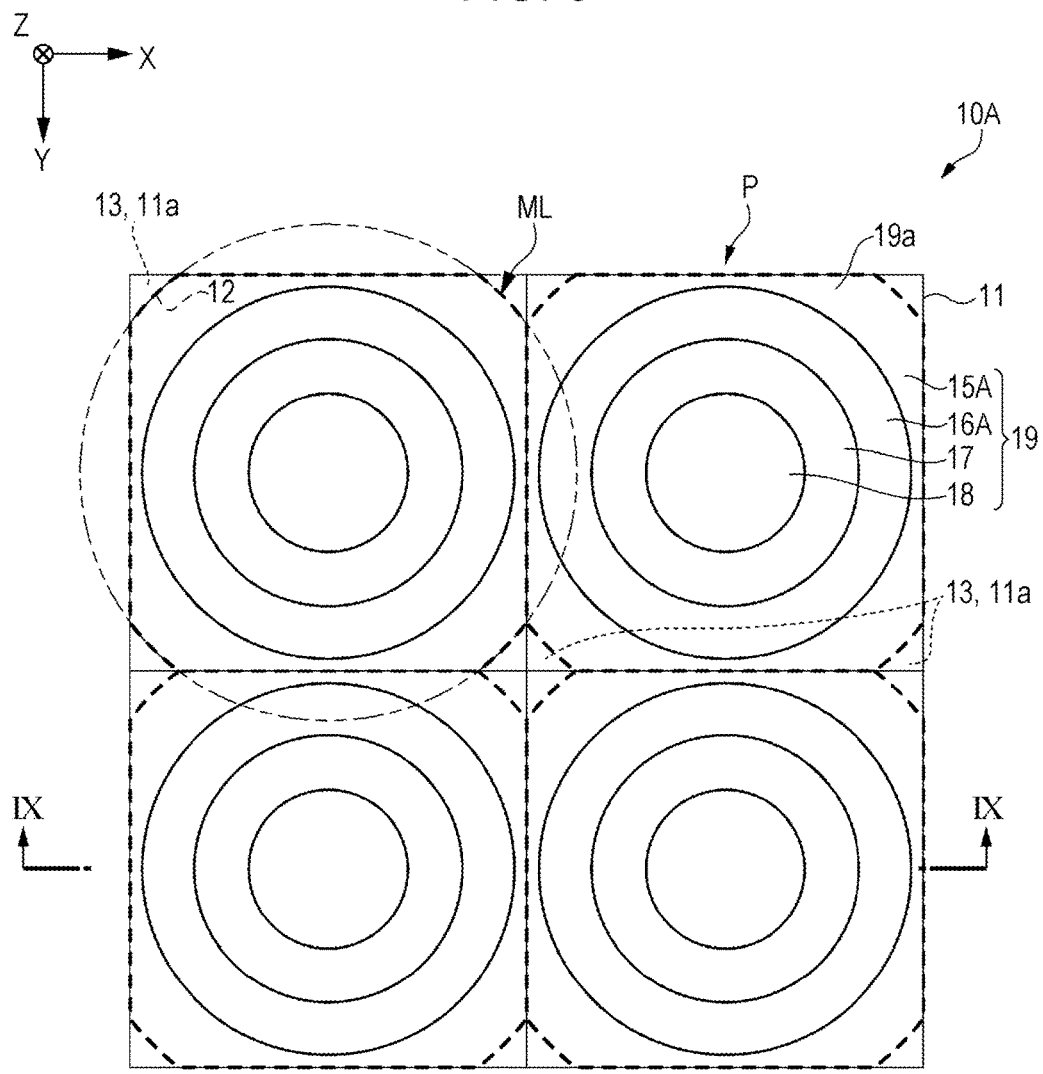

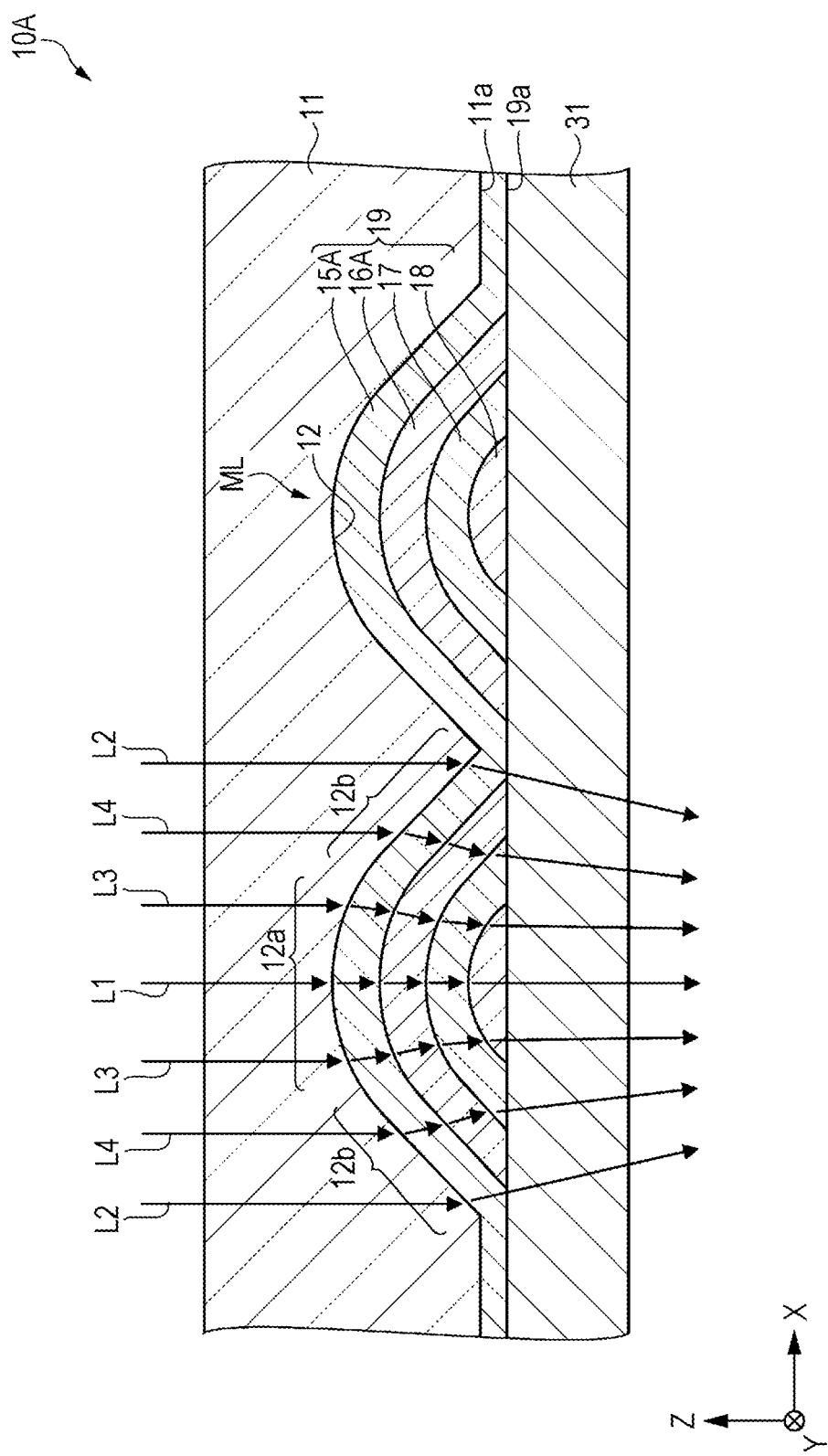

LENS ARRAY SUBSTRATE, METHOD OF MANUFACTURING LENS ARRAY SUBSTRATE, ELECTRO-OPTICAL DEVICE, AND ELECTRONIC APPARATUS

CROSS-REFERENCE TO RELATED APPLICATION

The present application is a continuation application of U.S. patent application Ser. No. 14/718,939 filed on May 21, 2015, which claims priority from Japanese Patent Application No. 2014-117366 filed Jun. 6, 2014, which are expressly incorporated by reference herein.

BACKGROUND

1. Technical Field

The present invention relates to a lens array substrate, a method of manufacturing a lens array substrate, an electro-optical device, and an electronic apparatus.

2. Related Art

An electro-optical device including an electro-optical material such as, for example, liquid crystal between an element substrate and a counter substrate is known. An example of the electro-optical device can include a liquid crystal device used as a liquid crystal light valve of a projector. In the liquid crystal device, a light shielding portion is provided in a region in which a switching element, a wiring, and the like are disposed, and a portion of incident light is shielded by the light shielding portion and is not used. Consequently, a configuration is known in which a microlens is provided on at least one substrate and light shielded by the light shielding portion disposed at a boundary between pixels, in light incident on the liquid crystal device, is condensed and is made to be incident on the inside of an opening of the pixel to thereby achieve an improvement in light utilization efficiency in the liquid crystal device.

However, the light condensed by the microlens converges, and then spreads radially and is emitted. As an angle at which the light spreads becomes larger, a variation in an angle of light passing through the microlens and being incident on a liquid crystal layer with respect to an orientation direction of liquid crystal is increased. For this reason, there is a problem in that the contrast of the liquid crystal device is decreased. In response to such a problem, a microlens array substrate (counter substrate) is proposed which has a lens layer in which two or more inorganic materials having different refractive indexes are laminated (for example, see JP-A-2007-226075).

In the microlens array substrate disclosed in JP-A-2007-226075, it is possible to improve light utilization efficiency by condensing incident light on the lens layer and to bring emitted light close to parallel light by refracting the light by an interface between a plurality of layers having different refractive indexes. In such a process of manufacturing the microlens array substrate, a plurality of spherical concave portions are formed in a substrate, and sol solutions which are inorganic materials having different refractive indexes are changed into a gel state by being repeatedly applied twice or more onto the surface of the substrate having the concave portions formed therein, thereby forming a lens layer constituted by a plurality of layers laminated. The surface of the uppermost layer in the plurality of layers constituting the lens layer is polished to be flattened, and a transparent electrode and a black matrix are formed thereon, and thus the uppermost layer of the lens layer serves as the surface of the microlens array substrate to form a boundary surface between the liquid crystal layer and the uppermost layer.

Incidentally, in the microlens array substrate disclosed in JP-A-2007-226075, a plurality of layers having different refractive indexes are laminated up to the uppermost layer from the central portion to the end of the spherical microlens. For this reason, incident light may be reflected from the interface between the layers having different refractive indexes at the end of the microlens in which an angle with respect to the surface of the substrate becomes larger, and thus there is a concern of light utilization efficiency being decreased by that amount.

In addition, in the process of manufacturing the microlens array substrate, when the lens layer is formed by laminating the plurality of layers on the substrate having the spherical concave portions formed therein, a concave portion having the spherical concave portion reflected therein is formed in the upper surface of each of the plurality of layers. Accordingly, in order to flatten the surface within a range of a layer thickness of the uppermost layer, the uppermost layer of the lens layer has to be formed to be thicker than the depth of the concave portion of a layer just below the uppermost layer. In addition, since an optical path length of the microlens is adjusted by the layer thickness of the uppermost layer of the lens layer, a predetermined layer thickness (residual thickness) has to be secured while flattening the surface in a process of polishing the uppermost layer of the lens layer, and thus there is a problem in that the optical path length cannot be easily adjusted.

SUMMARY

The invention can be realized in the following forms or application examples.

Application Example 1

According to this application example, there is provided a lens array substrate including a substrate which has a concave portion provided in a first face thereof; and a lens layer, having a substantially flat surface, which is provided so as to cover the first face and fill the concave portion. The lens layer includes a first layer, a second layer, and a third layer which are sequentially laminated from a substrate side by reflecting a shape of the concave portion therein. A refractive index of the first layer is larger than a refractive index of the second layer. A refractive index of the third layer is smaller than the refractive index of the second layer, and the refractive index of the third layer is larger than a refractive index of the substrate. The third layer, the second layer, and the first layer are sequentially exposed to the surface of the lens layer in this order toward an end from a central portion of the concave portion when seen in a plan view.

According to the configuration of this application example, the lens layer includes the first layer, the second layer, and the third layer which are sequentially laminated from the substrate side by reflecting the shape of the concave portion therein. Since the refractive index of the first layer is larger than the refractive index of the substrate, light incident from the substrate side is refracted toward the center side of a lens (concave portion) when seen in a plan view by the first layer. Since the refractive index of the second layer is smaller than the refractive index of the first layer and the refractive index of the third layer is smaller than the refractive index of the second layer, light incident from the first layer side is sequentially refracted toward the end side of the lens (concave portion) when seen in a plan view by the second layer and the third layer. Accordingly, it is possible to sequentially bring light, which is incident from the substrate side and is collected on the center side of the lens (concave portion) when seen in a plan view by the first layer, close to parallel light by the second layer and the third layer and to emit the light.

In addition, according to the configuration of this application example, the third layer, the second layer, and the first layer are sequentially exposed to the substantially flat surface of the lens layer toward the end from the central portion of the lens (concave portion). That is, the first layer, the second layer, and the third layer are present in the central portion of the lens (concave portion), but the third layer is not present toward the end from the central portion, and the second layer is also not present. For this reason, the reflection from an interface between layers having different refractive indexes is reduced more at the end of the lens in which an angle with respect to the surface of the substrate is increased than at the central portion thereof as compared with a case where a plurality of layers are similarly laminated from a central portion to an end of a lens as in the lens array substrate disclosed in JP-A-2007-226075, and thus it is possible to improve light utilization efficiency. In the process of manufacturing the lens array substrate, the surface of the lens layer may be able to be flattened within a range of the total thickness of the first layer, the second layer, and the third layer which are laminated, and thus it is not necessary to form the third layer which is the uppermost layer to be thicker than the depth of the concave portion reflected in the surface of the second layer located just below the third layer. Thereby, it is possible to reduce the number of processes in the process of forming the lens layer, as compared with the lens array substrate disclosed in JP-A-2007-226075.

Application Example 2

In the lens array substrate according to the application example, the lens layer may further include a fourth layer which is disposed closer to the substrate side than to the first layer, and a refractive index of the fourth layer may be larger than the refractive index of the first layer.

According to the configuration of this application example, the lens layer includes the fourth layer which is disposed closer to the surface side opposite to the surface than to the first layer and has a refractive index larger than the refractive index of the first layer, and thus it is possible to bring light, which is incident from the substrate side and is refracted toward the center side of the lens (concave portion) when seen in a plan view by the fourth layer, closer to parallel light and to emit the light by sequentially refracting the light toward the end side of the lens (concave portion) when seen in a plan view by the first layer, the second layer, and the third layer.

Application Example 3

In the lens array substrate according to the application example, the lens layer may further include a fourth layer which is disposed closer to the substrate side than to the first layer, and a refractive index of the fourth layer may be smaller than the refractive index of the first layer, and the refractive index of the fourth layer is larger than the refractive index of the second layer.

According to the configuration of this application example, it is possible to further refract light, which is incident from the substrate side and is refracted toward the center side of the lens (concave portion) when seen in a plan view by the fourth layer, toward the center side by the first layer and then sequentially refract the light toward the end side of the lens (concave portion) when seen in a plan view by the second layer and the third layer to thereby bring the light close to parallel light.

Application Example 4

In the lens array substrate according to the application example, it is preferable that the third layer, the second layer, the first layer, and the fourth layer are sequentially exposed to the surface of the lens layer in this order toward the end from the central portion of the concave portion.

According to the configuration of this application example, four layers of the fourth layer, the first layer, the second layer, and the third layer are present in the central portion of the lens (concave portion). However, three layers and two layers are present toward the end from the central portion, and only one layer of the fourth layer is present at the end thereof. For this reason, the reflection from an interface between layers having different refractive indexes is suppressed at the end in which an angle with respect to the surface of the substrate is increased, and thus it is possible to improve light utilization efficiency. In the process of manufacturing the lens array substrate, even when the lens layer is formed by laminating four layers, it is not necessary to form the third layer which is the uppermost layer to be thicker than the depth of the concave portion reflected in the surface of the second layer located below the third layer, and thus it is possible to reduce the number of processes in the process of forming the lens layer.

Application Example 5

In the lens array substrate according to the application example, a contour shape of the third layer in the surface and a contour shape of the second layer in the surface may be a concentrically circular shape with a center position of the concave portion when seen in a plan view as a center.

According to the configuration of this application example, a region in which the layers up to the third layer are laminated and a region in which the layers up to the second layer are laminated, toward the end from the central portion of the lens (concave portion), are distributed in a concentrically circular shape. For this reason, it is possible to distribute a region in which inclinations of light emitted from the lens with respect to a normal direction of the surface of the substrate become substantially the same as each other, in a concentrically circular shape.

Application Example 6

In the lens array substrate according to the application example, a contour shape of the concave portion when seen in a plan view may have a linear portion, and a contour shape of the third layer in the surface and a contour shape of the second layer in the surface may have a portion along the linear portion.

According to the configuration of this application example, for example, when the contour shape of the lens layer is a rectangular shape, a region in which the layers up to the third layer are laminated and a region in which the layers up to the second layer are laminated, toward the end from the central portion of the lens (concave portion), are distributed in a shape along the contour shape of the lens layer. For this reason, it is possible to distribute a region in which inclinations of light emitted from the lens with respect to the normal direction of the surface of the substrate become substantially the same as each other, along the contour shape of the lens layer.

Application Example 7

In the lens array substrate according to the application example, it is preferable that the lens array substrate further includes a light-transmitting layer, having a refractive index smaller than a refractive index of the lens layer, which is provided so as to cover the surface of the lens layer.

According to the configuration of this application example, it is possible to adjust an optical path length of the lens by the layer thickness of the light-transmitting layer provided so as to cover the surface of the lens layer. For this reason, it is possible to easily adjust the optical path length of the lens to a desired optical path length, as compared with a case where an optical path length is adjusted by a layer thickness of a lens layer while flattening the uppermost layer of the lens layer as in the lens array substrate disclosed in JP-A-2007-226075.

Application Example 8

In the lens array substrate according to the application example, it is preferable that the end of the concave portion is formed as an inclined surface which is inclined toward the central portion of the concave portion from the first face when seen in a cross-sectional view.

According to the configuration of this application example, since the end of the concave portion is formed as an inclined surface, an angle of the end of the concave portion with respect to the surface of the substrate can be reduced as compared with a case where the concave portion has a spherical shape, and thus it is possible to reduce the reflection from an interface between the substrate and the lens layer.

Application Example 9

According to this application example, there is provided a method of manufacturing a lens array substrate, the method including forming a concave portion in a first face of a substrate, forming a lens layer so as to cover the first face of the substrate and fill the concave portion; flattening the lens layer by polishing a surface of the lens layer; and forming a light-transmitting layer by disposing a material having a refractive index smaller than a refractive index of the lens layer so as to cover the surface of the lens layer. The forming of a lens layer includes forming a first layer by disposing a material having a refractive index larger than a refractive index of the substrate, forming a second layer above the first layer by disposing a material having a refractive index smaller than a refractive index of the first layer, and forming a third layer above the second layer by disposing a material having a refractive index smaller than a refractive index of the second layer. In the flattening of the lens layer, polishing is performed until the first layer is exposed at an end of the concave portion.

According to the manufacturing method of this application example, in the forming of a lens layer, the lens layer is formed by laminating the first layer, the second layer, and the third layer so as to cover the first face of the substrate and fill the concave portion, and thus the shape of the concave portion of the substrate is reflected in the surface of the third layer serving as the uppermost layer. In the flattening of the lens layer, the surface of the lens layer is polished and flattened until the first layer is exposed to the end of the concave portion, and thus the third layer is not present toward the end from the central portion of the lens (concave portion), and the second lens layer is also not present. For this reason, the reflection from an interface between layers having different refractive indexes is reduced more at the end of the lens in which an angle with respect to the surface of the substrate is increased than at the central portion thereof as compared with a case where a plurality of layers are similarly laminated from a central portion and an end of a lens as in the lens array substrate disclosed in JP-A-2007-226075, and thus it is possible to improve light utilization efficiency. In addition, the surface of the lens layer may be able to be flattened within a range of the total thickness of the first layer, the second layer, and the third layer in the flattening of the lens layer, and thus it is not necessary to form the third layer which is the uppermost layer to be thicker than the depth of the concave portion reflected in the surface of the second layer located below the third layer in the forming of a lens layer. Thereby, it is possible to reduce the number of processes in the forming of a lens layer, as compared with the lens array substrate disclosed in JP-A-2007-226075. Further, since the method includes the forming of a light-transmitting layer so as to cover the surface of the lens layer, it is possible to adjust the optical path length of the lens by the layer thickness of the light-transmitting layer. For this reason, it is possible to easily adjust the optical path length of the lens to a desired optical path length, as compared with a case where an optical path length is adjusted by a layer thickness (residual thickness) of a lens layer while flattening the uppermost layer of the lens layer as in the lens array substrate disclosed in JP-A-2007-226075.

Application Example 10

According to this application example, there is provided an electro-optical device including a first substrate; a second substrate which is disposed so as to face the first substrate; and an electro-optical layer which is disposed between the first substrate and the second substrate. The second substrate includes the lens array substrate according to the above-mentioned application example or a lens array substrate manufactured by the method of manufacturing a lens array substrate according to the above-mentioned application example.

According to the configuration of this application example, in the electro-optical device, the second substrate is provided with the lens array substrate which can improve light utilization efficiency by suppressing reflection from the end thereof to collect incident light and can bring emitted light close to parallel light by refracting light by an interface between a plurality of layers having different refractive indexes. Thereby, it is possible to provide the electro-optical device having bright display and satisfactory contrast.

Application Example 11

According to this application example, there is provided an electronic apparatus including an electro-optical device manufacturing by the method of manufacturing an electro-optical device according to the above-mentioned application example and the electro-optical device according to the above-mentioned application example.

According to the configuration of this application example, it is possible to provide the electronic apparatus having bright display and satisfactory contrast.

BRIEF DESCRIPTION OF THE DRAWINGS

The invention will be described with reference to the accompanying drawings, wherein like numbers reference like elements.

FIG. 5 is a schematic cross-sectional view illustrating the configuration of the microlens array substrate according to the first embodiment.

FIG. 8 is a schematic plan view illustrating the configuration of a microlens array substrate according to a second embodiment.

FIG. 9 is a schematic cross-sectional view illustrating the configuration of the microlens array substrate according to the second embodiment.

DESCRIPTION OF EXEMPLARY EMBODIMENTS

Figure 1:
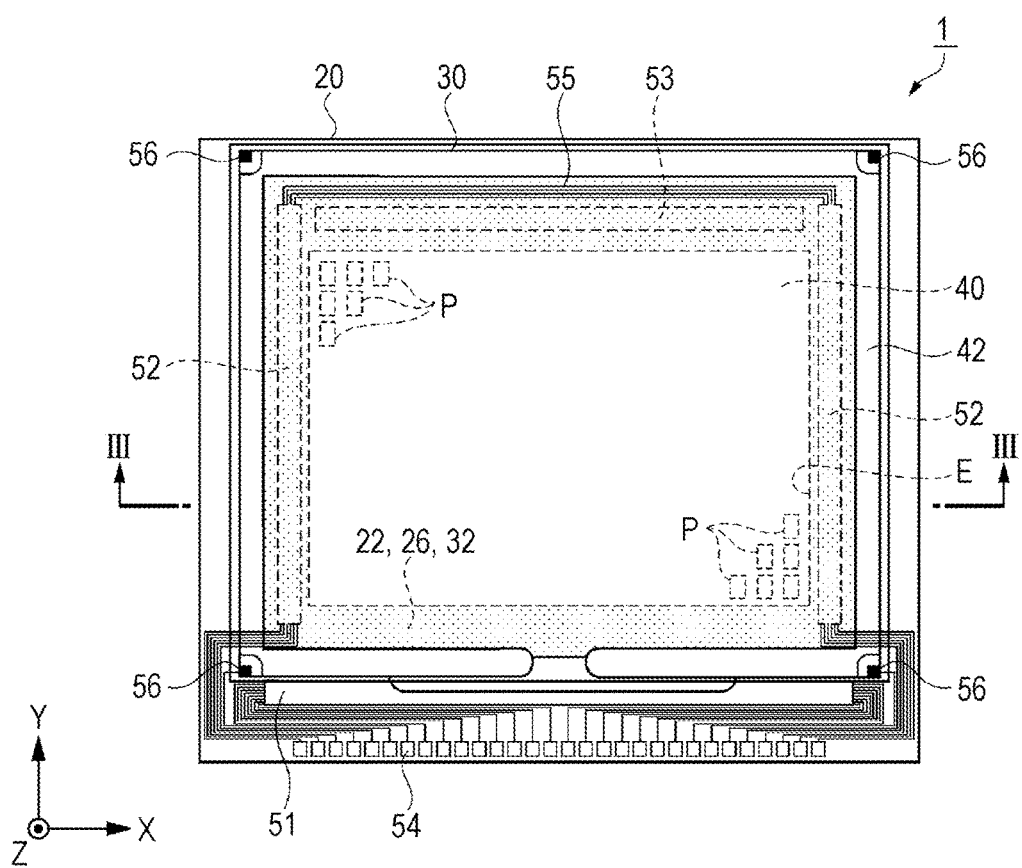
FIG. 1 is a schematic plan view illustrating the configuration of a liquid crystal device according to a first embodiment.

Hereinafter, specific embodiments of the invention will be described with reference to the accompanying drawings. Drawings to be used are illustrated by being appropriately enlarged, reduced, or exaggerated so that a portion to be described is in a recognizable state. In addition, constituent elements other than components necessary for description may not be illustrated in the drawing.

Meanwhile, in the following embodiment, when describing "on substrate", for example, the case denotes a case of being disposed so as to come into contact with a substrate thereon, a case of being disposed on the substrate through another component, or a case of being disposed on the substrate so that a portion comes into contact with the substrate thereon and a portion is disposed through another component.

First Embodiment

Electro-Optical Device

Here, a description will be given by taking an example of an active matrix type liquid crystal device, including a thin film transistor (TFT) as a switching element of a pixel, as an electro-optical device. For example, the liquid crystal device can be preferably used as a liquid crystal light valve of a projector to be described later.

Figure 2:
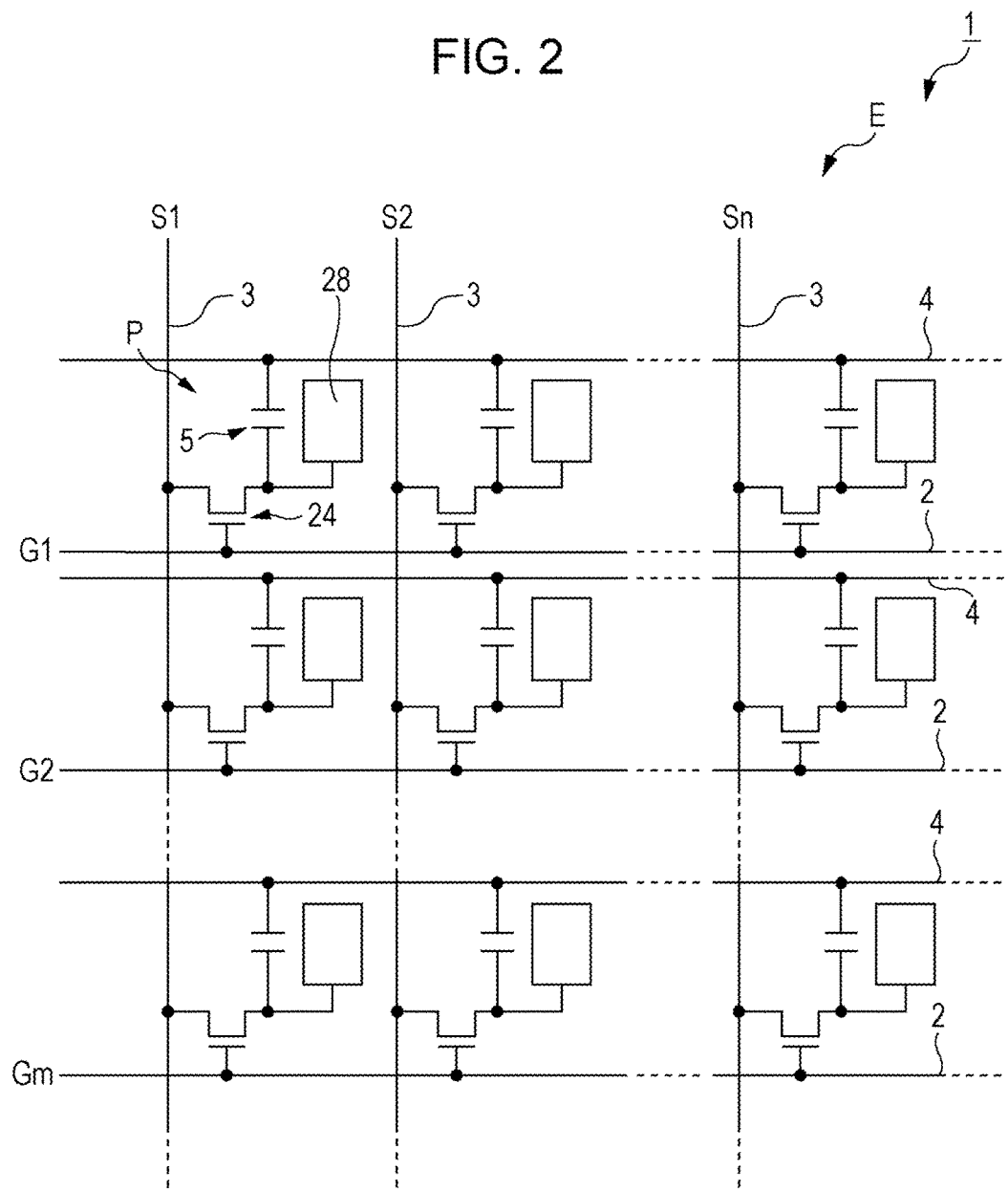
FIG. 2 is an equivalent circuit diagram illustrating an electrical configuration of the liquid crystal device according to the first embodiment.
Figure 3:
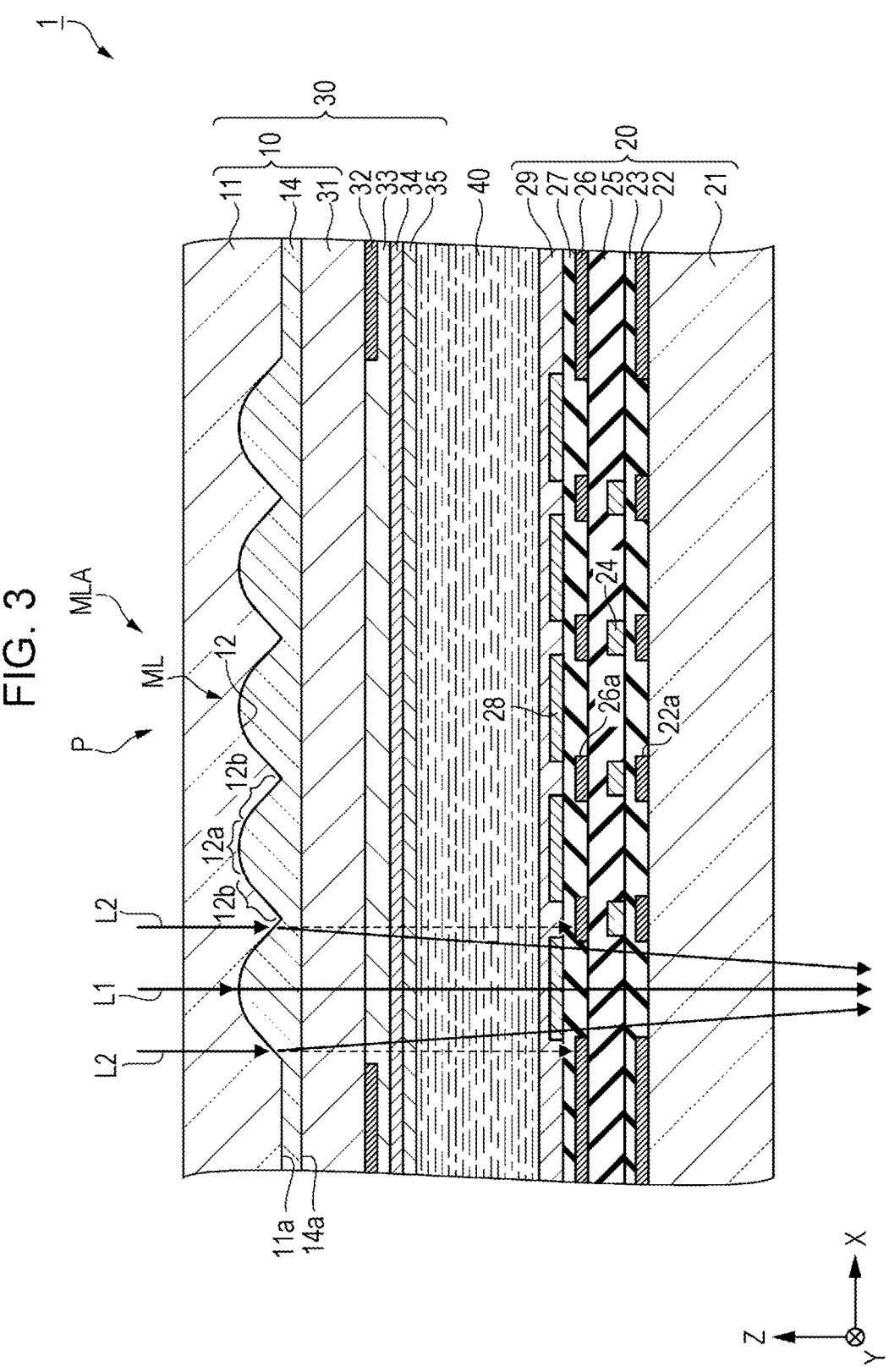
FIG. 3 is a schematic cross-sectional view illustrating the configuration of the liquid crystal device according to the first embodiment.

First, a liquid crystal device as an electro-optical device according to a first embodiment will be described with reference to FIGS. 1 to 3. FIG. 1 is a schematic plan view illustrating the configuration of the liquid crystal device according to the first embodiment. FIG. 2 is an equivalent circuit diagram illustrating an electrical configuration of the liquid crystal device according to the first embodiment. FIG. 3 is a schematic cross-sectional view illustrating the configuration of the liquid crystal device according to the first embodiment. In detail, FIG. 3 is a schematic cross-sectional view taken along line III-III of FIG. 1.

As illustrated in FIGS. 1 and 3, a liquid crystal device 1 according to the present embodiment includes an element substrate 20 as a first substrate, a counter substrate 30 as a second substrate which is disposed so as to face the element substrate 20, a sealing material 42, and a liquid crystal layer 40 as an electro-optical layer. As illustrated in FIG. 1, the element substrate 20 is larger than the counter substrate 30, and both the substrates are bonded to each other through the sealing material 42 disposed in a frame shape along the edge portion of the counter substrate 30.

The liquid crystal layer 40 is formed of liquid crystal having positive or negative dielectric anisotropy which is sealed in a space surrounded by the element substrate 20, the counter substrate 30, and the sealing material 42. The sealing material 42 is constituted by an adhesive such as, for example, a thermosetting or ultraviolet curing epoxy resin. A spacer (not shown) for constantly maintaining a gap between the element substrate 20 and the counter substrate 30 is mixed into the sealing material 42.

Light shielding layers 22 and 26 provided in the element substrate 20 and a light shielding layer 32 provided in the counter substrate 30 are disposed on the inner side of the sealing material 42 disposed in a frame shape. The light shielding layers 22, 26, and 32 have a frame-like peripheral edge and is formed of, for example, a light-shielding metal or a metal oxide. The inner side of the frame-like light shielding layers 22, 26, and 32 serves as a display region E in which a plurality of pixels P are arrayed. The pixel P has, for example, a substantially rectangular shape, and the pixels are arrayed in a matrix.

The display region E is a region that substantially contributes to the display in the liquid crystal device 1. The light shielding layers 22 and 26 provided in the element substrate 20 are provided, for example, in a lattice shape so as to partition opening regions of the plurality of pixels P in a plane manner in the display region E. Meanwhile, the liquid crystal device 1 may include a dummy region, provided so as to surround the vicinity of the display region E, which does not substantially contribute to the display.

A data line driving circuit 51 and a plurality of external connection terminals 54 are provided on the side of the sealing material 42, formed along a first side of the element substrate 20, which is opposite to the display region E along the first side. In addition, an inspection circuit 53 is provided on the display region E side of the sealing material 42 along a second side facing the first side. Further, a scanning line driving circuit 52 is provided on the inner side of the sealing material 42 along two other sides which are perpendicular to the above-mentioned two sides and face each other.

A plurality of wirings 55 linking two scanning line driving circuits 52 together are provided on the display region E side of the sealing material 42 along the second side provided with the inspection circuit 53. The wirings leading to the data line driving circuit 51 and the scanning line driving circuit 52 are connected to the plurality of external connection terminal 54. In addition, vertical conduction portions 56 for allowing electrical conduction between the element substrate 20 and the counter substrate 30 are provided at corner portions of the counter substrate 30. Meanwhile, the arrangement of the inspection circuit 53 is not limited thereto, and the inspection circuit may be provided at a position along the inside of the sealing material 42 between the data line driving circuit 51 and the display region E.

In the following description, a direction along the first side provided with the data line driving circuit 51 is assumed to be an X-direction as a first direction, and a direction along two other sides which are perpendicular to the first side and face each other is assumed to be a Y-direction as a second direction. The X-direction is a direction along line III-III of FIG. 1. The light shielding layers 22 and 26 are provided in a lattice shape along the X-direction and the Y-direction. The opening regions of the pixels P are partitioned in a lattice shape by the light shielding layers 22 and 26, and are arrayed in a matrix along the X-direction and the Y-direction.

In addition, a direction which is perpendicular to the X-direction and the Y-direction and is directed upward in FIG. 1 is assumed to be a Z-direction. Meanwhile, in this specification, viewing from a normal direction (+Z-direction) of the surface of the liquid crystal device 1 on the counter substrate 30 side is referred to as "when seen in a plan view".

As illustrated in FIG. 2, scanning lines 2 and data lines 3 are formed in the display region E so as to intersect each other, and the pixels P are provided so as to correspond to the intersection between the scanning lines 2 and the data lines 3. Each of the pixels P is provided with a pixel electrode 28 and a TFT 24 as a switching element.

A source electrode (not shown) of the TFT 24 is electrically connected to the data line 3 extending from the data line driving circuit 51. Image signals (data signals) S1, S2, . . . , Sn are line-sequentially supplied to the data lines 3 from the data line driving circuit 51 (see FIG. 1). A gate electrode (not shown) of the TFT 24 is a portion of the scanning line 2 extending from the scanning line driving circuit 52. Scanning signals G1, G2, . . . , Gm are line-sequentially supplied to the scanning lines 2 from the scanning line driving circuit 52. A drain electrode (not shown) of the TFT 24 is electrically connected to the pixel electrode 28.

The image signals S1, S2, . . . , Sn are written in the pixel electrodes 28 at a predetermined timing through the data lines 3 by setting the TFTs 24 to be in an on state for a certain period of time. In this manner, an image signal of a predetermined level which is written in the liquid crystal layer 40 through the pixel electrode 28 is held for a certain period of time by a liquid crystal capacitor formed between the image signal and a common electrode 34 (see FIG. 3) provided in the counter substrate 30.

Meanwhile, in order to prevent the held image signals S1, S2, . . . , Sn from leaking, a storage capacitor 5 is formed between the pixel electrode 28 and a capacitance line 4 formed along the scanning line 2, and is disposed in parallel with the liquid crystal capacitor. In this manner, when a voltage signal is applied to the liquid crystal of each of the pixels P, an orientation state of the liquid crystal changes by a voltage level applied. Thereby, light incident on the liquid crystal layer 40 (see FIG. 3) is modulated, and thus it is possible to perform gradation display.

Liquid crystal for forming the liquid crystal layer 40 modulates light and allows gradation display to be performed by the orientation and order of a molecular aggregate being changed by a voltage level applied. For example, in a case of a normally white mode, transmittance for incident light is decreased in accordance with a voltage applied in units of each pixel P, and light with contrast corresponding to an image signal is emitted from the liquid crystal device 1 as a whole.

As illustrated in FIG. 3, the counter substrate 30 includes a microlens array substrate 10 according to the first embodiment, the light shielding layer 32, a protection layer 33, the common electrode 34, and an orientation film 35. The microlens array substrate 10 according to the first embodiment includes a substrate 11, a lens layer 14, and an optical path length adjustment layer 31 as a light-transmitting layer.

The substrate 11 is formed of an inorganic material such as, for example, glass or quartz which has light transmittance. The substrate 11 has a plurality of concave portions 12 formed in a surface 11a (first surface) on the liquid crystal layer 40 side. Each of the concave portions 12 is provided so as to correspond to the pixel P. For example, a cross-sectional shape of the concave portion 12 is configured such that the central portion thereof serves as a curved surface portion 12a and a peripheral edge surrounding the curved surface portion 12a serves as an inclined surface 12b (so-called tapered surface).

The lens layer 14 is formed to be thicker than the depth of the concave portion 12 so as to cover the surface 11a of the substrate 11 by filling the concave portion 12. The lens layer 14 is formed of a material having light transmittance and a light refractive index different from that of the substrate 11. In the present embodiment, the lens layer 14 is formed of an inorganic material having a light refractive index larger than that of the substrate 11. Examples of the inorganic material can include SiON, $Al_2O_3$, and the like. Meanwhile, although this will be described later in detail, the lens layer 14 is constituted by, for example, four lens layers having different refractive indexes.

Microlenses ML having a convex shape are formed by filling the concave portions 12 with a material for forming the lens layer 14. Accordingly, each of the microlenses ML is provided so as to correspond to the pixel P. In addition, a microlens array MLA is constituted by the plurality of microlenses ML. A surface 14a of the lens layer 14 is formed as a substantially flat surface.

Meanwhile, incident light incident on the central portion (curved surface portion 12a) of the microlens ML is condensed toward the center side of the microlens ML. In addition, incident light incident on the peripheral edge (inclined surface 12b) of the microlens ML is refracted toward the center side of the microlens ML. The incident light beams incident on the inclined surfaces 12b of the microlens ML are refracted at substantially the same angle if the incidence angles are substantially the same. For this reason, the excessive reflection of the incident light beam is suppressed, and variations in the angle of light incident on the liquid crystal layer 40 are suppressed, as compared with a case where the entire microlens ML is constituted by a curved surface portion.

The optical path length adjustment layer 31 is formed so as to cover the surface 14a of the lens layer 14. The optical path length adjustment layer 31 is formed of an inorganic material having light transmittance and a light refractive index of the same level as that of, for example, the substrate 11. Examples of such an inorganic material can include $SiO_2$ and the like. The optical path length adjustment layer 31 has a function of adjusting a distance (optical path length) between the microlens ML and the light shielding layer 26 to a desired value. Accordingly, a layer thickness of the optical path length adjustment layer 31 is appropriately set on the basis of optical conditions such as a focal distance of the microlens ML according to the wavelength of light. The surface of the optical path length adjustment layer 31 is formed as a substantially flat surface.

The light shielding layer 32 is provided on the microlens array substrate 10 (optical path length adjustment layer 31). The light shielding layer 32 is provided so as to surround the vicinity of the display region E (see FIG. 1) in which the microlens ML is disposed. The light shielding layer 32 is formed of, for example, a metal or a metal compound.

The light shielding layer 32 may be provided within the display region E so as to overlap the light shielding layer 22 and light shielding layer 26 of the element substrate 20 when seen in a plan view. In this case, the light shielding layer 32 may be formed in a lattice shape, an island shape, a stripe shape, or the like, but is preferably disposed in a range narrower than those of the light shielding layer 22 and the light shielding layer 26 when seen in a plan view.

The protection layer 33 is provided so as to cover the microlens array substrate 10 (optical path length adjustment layer 31) and the light shielding layer 32. The common electrode 34 is provided so as to cover the protection layer 33.

The common electrode 34 is formed across the plurality of pixels P. The common electrode 34 is constituted by a transparent conductive film such as, for example, indium tin oxide (ITO) or indium zinc oxide (IZO).

Meanwhile, the protection layer 33 covers the light shielding layer 32 so that the surface of the common electrode 34 on the liquid crystal layer 40 side becomes flat, but the common electrode 34 may be formed so as to directly cover the conductive light shielding layer 32 without providing the protection layer 33. The orientation film 35 may be provided so as to cover the common electrode 34.

The element substrate 20 includes a substrate 21, a light shielding layer 22, an insulating layer 23, a TFT 24, an insulating layer 25, a light shielding layer 26, an insulating layer 27, a pixel electrode 28, and an orientation film 29. The substrate 21 is formed of a material such as, for example, glass or quartz which has light transmittance.

The light shielding layer 22 is provided on the substrate 21. The light shielding layer 22 is formed in a lattice shape so as to overlap the light shielding layer 26 located at an upper layer when seen in a plan view. The light shielding layer 22 and the light shielding layer 26 are formed of, for example, a metal or a metal compound. The light shielding layer 22 and the light shielding layer 26 are disposed with the TFT 24 interposed therebetween in the thickness direction (Z-direction) of the element substrate 20. The light shielding layer 22 overlaps at least a channel region of the TFT 24 when seen in a plan view.

Since the incidence of light on the TFT 24 is suppressed by providing the light shielding layer 22 and the light shielding layer 26, it is possible to suppress an increase in an optical leakage current in the TFT 24 and malfunction due to light. A region (inside an opening 22a) surrounded by the light shielding layer 22 and a region (inside an opening 26a) surrounded by the light shielding layer 26 overlap each other when seen in a plan view, and serve as openings through which light passes through in the region of the pixel P.

The insulating layer 23 is provided so as to cover the substrate 21 and the light shielding layer 22. The insulating layer 23 is formed of an inorganic material such as, for example, $SiO_2$.

The TFT 24 is provided on the insulating layer 23, and is disposed in a region overlapping the light shielding layer 22 and the light shielding layer 26 when seen in a plan view. The TFT 24 is a switching element that drives the pixel electrode 28. The TFT 24 is constituted by a semiconductor layer, a gate electrode, a source electrode, and a drain electrode which are not shown in the drawing. A source region, a channel region, and a drain region are formed in the semiconductor layer. A lightly doped drain (LDD) region may be formed in an interface between the channel region and the source region or an interface between the channel region and the drain region.

The gate electrode is formed in a region overlapping the channel region of the semiconductor layer when seen in a plan view in the element substrate 20 through a portion (gate insulating film) of the insulating layer 25. Although not shown in the drawing, the gate electrode is electrically connected to scanning lines disposed on the lower layer side through a contact hole and controls turn-on and turn-off of the TFT 24 by a scanning signal applied thereto.

The insulating layer 25 is provided so as to cover the insulating layer 23 and the TFT 24. The insulating layer 25 is formed of an inorganic material such as, for example, $SiO_2$. The insulating layer 25 includes a gate insulating film insulating the semiconductor layer and the gate electrode of the TFT 24 from each other. Surface irregularities occurring due to the TFT 24 are moderated by the insulating layer 25. The light shielding layer 26 is provided on the insulating layer 25. The insulating layer 27 formed of an inorganic material is provided so as to cover the insulating layer 25 and the light shielding layer 26.

The pixel electrode 28 is provided on the insulating layer 27 so as to correspond to the pixel P. The pixel electrode 28 is disposed in a region overlapping the opening 22a of the light shielding layer 22 and the opening 26a of the light shielding layer 26 when seen in a plan view. The pixel electrode 28 is constituted by a transparent conductive film such as, for example, indium tin oxide (ITO) or indium zinc oxide (IZO). The orientation film 29 is provided so as to cover the pixel electrode 28. The liquid crystal layer 40 is sealed between the orientation film 29 on the element substrate 20 side and the orientation film 35 on the counter substrate 30 side.

Meanwhile, although not shown in the drawing, an electrode, a wiring, and a relay electrode for supplying an electrical signal to the TFT 24, capacitance electrode constituting the storage capacitor 5 (see FIG. 2), and the like are provided in a region overlapping the light shielding layer 22 and the light shielding layer 26 when seen in a plan view. The light shielding layer 22 and the light shielding layer 26 may be configured to include the electrode, the wiring, the relay electrode, the capacitance electrode, and the like.

In the liquid crystal device 1 according to the first embodiment, light emitted from, for example, a light source is incident from the counter substrate 30 (microlens array substrate 10) side. In the incident light, a light beam L1 incident on the center of the microlens ML along a normal direction of the surface of the microlens array substrate 10 (substrate 11) advances straight, passes through the opening region of the pixel P, and is emitted to the element substrate 20 side. Meanwhile, hereinafter, the normal direction of the surface (surface 11a of the substrate 11) of the microlens array substrate 10 is simply referred to as a "normal direction".

If a light beam L2 incident on the end of the microlens ML along the normal direction advances straight, the light beam is shielded by the light shielding layer 26 as shown by a dashed line. However, the light beam is refracted toward the center side of the microlens ML due to a difference (positive refractive power) in light refractive index between the substrate 11 and the lens layer 14, passes through the opening region of the pixel P, and is emitted toward the element substrate 20. Meanwhile, although this will be described later in detail, the light beam L2 incident on the lens layer 14 is refracted by an interface between lens layers having different refractive indexes also within the lens layer 14.

In this manner, in the liquid crystal device 1, it is possible to allow the light beam L2, shielded by the light shielding layer 32 and the light shielding layer 26 when advancing straight, to be refracted toward the center side of the pixel P and to pass through the opening by an action of the microlens ML. As a result, since the amount of light emitted from the element substrate 20 side can be increased, and thus it is possible to increase light utilization efficiency.

Microlens Array Substrate

Figure 4:
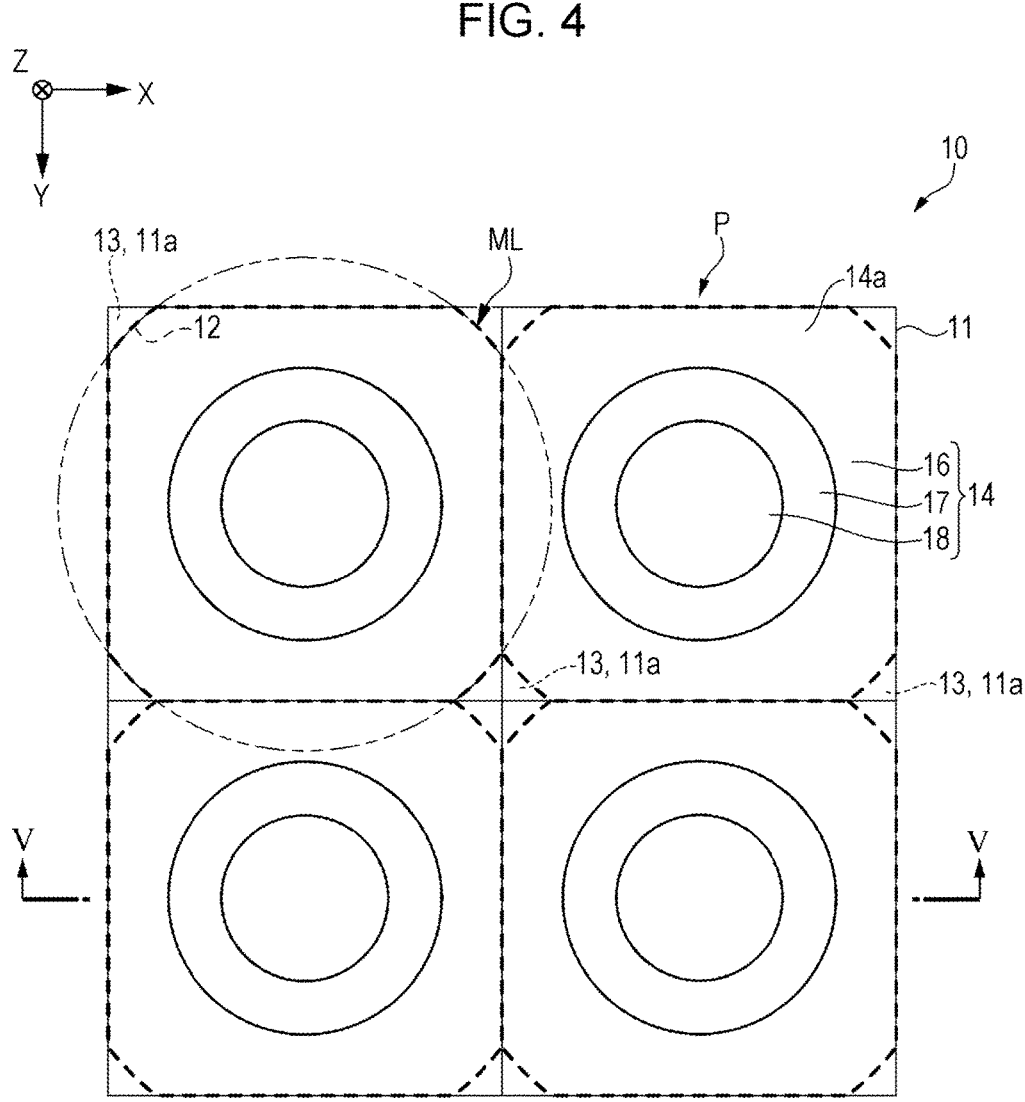
FIG. 4 is a schematic cross-sectional view illustrating the configuration of a microlens array substrate according to the first embodiment.

Next, the configuration of the microlens array substrate 10 according to the first embodiment will be described with reference to FIGS. 4 and 5. FIG. 4 is a schematic plan view illustrating the configuration of the microlens array substrate according to the first embodiment. FIG. 5 is a schematic cross-sectional view illustrating the configuration of the microlens array substrate according to the first embodiment.

FIG. 4 is a schematic plan view of the microlens array substrate 10 when seen from the optical path length adjustment layer 31 side (−Z-direction). Meanwhile, the optical path length adjustment layer 31 is not shown in FIG. 4. FIG. 4 illustrates the microlens ML and four pixels P adjacent to each other in the X-direction and the Y-direction. Each of the pixels P has a substantially rectangular planar shape, and the pixels P adjacent to each other in the X-direction and the Y-direction are arrayed so as to come into contact with each other.

The concave portion 12 constituting the lens shape of the microlens ML included in the microlens array substrate 10 according to the first embodiment virtually has a circular external shape shown by a two-dot chain line. For example, the virtual external shape of the concave portion 12 is larger than an inscribed circle of the pixel P and is smaller than a circumscribed circle thereof. In other words, the diameter of the virtual external shape (circular shape) of the concave portion 12 is smaller than the length of a diagonal line connecting the opposite angles of the pixel P.

The plurality of concave portions 12 are arrayed so that the concave portions 12 adjacent to each other in the X-direction and the Y-direction come into contact with each other. Accordingly, the concave portions 12 adjacent to each other in the X-direction and the Y-direction are connected to each other. On the other hand, the concave portions 12 adjacent to each other in the diagonal direction of the pixel P are separated from each other. A region between the concave portions 12 adjacent to each other in the diagonal direction is formed as a flat portion 13 in which the lens layer 14 is formed on the surface 11a of the substrate 11.

FIG. 5 is a schematic cross-sectional view taken along line V-V of FIG. 4 and is a partially enlarged view of the microlens array substrate 10 illustrated in FIG. 3. FIG. 5 illustrates two microlenses ML adjacent to each other in the X-direction.

As illustrated in FIG. 5, the lens layer 14 is constituted by a lens layer 15 as a fourth lens layer, a lens layer 16 as a first lens layer, a lens layer 17 as a second lens layer, and a lens layer 18 as a third lens layer which are sequentially laminated toward the surface 14a from the concave portion 12 side.

In other words, the microlens ML is configured such that four microlens of a first microlens (lens layer 15), a second microlens (lens layer 16), a third microlens (lens layer 17), and a fourth microlens (lens layer 18) are laminated from the concave portion 12 side.

The lens layer 15, the lens layer 16, the lens layer 17, and the lens layer 18 are formed to have the same level of layer thickness. The shape of the concave portion 12 is reflected in the surface of the lens layer 15, and the shapes of the lower layers thereof are sequentially reflected in the respective surfaces of the lens layer 16, the lens layer 17, and the lens layer 18.

The surface 14a of the lens layer 14 is flattened until the lens layer 16 is exposed. Accordingly, a region in which four layers of the lens layer 15 to the lens layer 18 are laminated, a region in which three layers of the lens layer 15 to the lens layer 17 are laminated, and a region in which two layers of the lens layer 15 and the lens layer 16 are laminated, toward the end from the central portion of the microlens ML, are present.

The lens layer 15, the lens layer 16, the lens layer 17, and the lens layer 18 have different light refractive indexes. More specifically, the light refractive indexes of the lens layers and the substrate 11 have a relationship of the substrate 11<the lens layer 18<the lens layer 17<the lens layer 16<the lens layer 15. For example, when the lens layer 15, the lens layer 16, the lens layer 17, and the lens layer 18 are formed of SiON, it is possible to make the light refractive indexes of the respective lens layers different from each other by making ratios between oxygen (O) to nitrogen (N) different from each other.

Meanwhile, the light refractive index of the optical path length adjustment layer 31 is the same level as the light refractive index of the substrate 11, but may be smaller than the light refractive index of the lens layer 18 and may be larger than the light refractive index of the substrate 11.

As illustrated in FIG. 4, when the microlens array substrate 10 is seen from the optical path length adjustment layer 31 side, the lens layer 18, the lens layer 17, and the lens layer 16 are sequentially exposed to the surface 14a of the lens layer 14 toward the end from the central portion of the concave portion 12 when seen in a plan view. The lens layer 15 is covered with the lens layer 16, the lens layer 17, and the lens layer 18.

The contour shape of the lens layer 18 (outer edge of an exposed portion of the lens layer 18) and the contour shape of the lens layer 17 (outer edge of an exposed portion of the lens layer 17) are a concentrically circular shape with the center position of the concave portion 12 when seen in a plan view as a center. That is, the contour shapes of the lens layer 18 and the lens layer 17 are a concentrically circular shape which is the virtual external shape (circular shape) of the concave portion 12.

The action of the microlens ML included in the microlens array substrate 10 according to the first embodiment will be described below with reference to FIG. 5. Since the light refractive index of the lens layer 15 is larger than the light refractive index of the substrate 11, the first microlens (lens layer 15) has a positive refractive power. Since the light refractive index of the lens layer 16 is smaller than the light refractive index of the lens layer 15, the second microlens (lens layer 16) has a negative refractive power. Similarly, the third microlens (lens layer 17) and the fourth microlens (lens layer 18) have a negative refractive power.

As described above, the light beam L1 incident on the center of the microlens ML along the normal direction passes through the lens layer 15, the lens layer 16, the lens layer 17, and the lens layer 18 as it is and is emitted from the lens layer 18.

Light beams L3 incident on the curved surface portion 12a on the side further outside than the center of the microlens ML are refracted toward the center side of the microlens ML by a positive refractive power of the first microlens (lens layer 15) and are refracted to the outside with respect to the center of the microlens ML by a negative refractive power of the second microlens (lens layer 16). The light beams L3 are refracted to the outside with respect to the center of the microlens ML by the third microlens (lens layer 17) and the fourth microlens (lens layer 18). For this reason, the light beams L3 refracted by the lens layer 15 and inclining to the normal direction sequentially approach the normal direction by the lens layer 16, the lens layer 17, and the lens layer 18 and are emitted from the lens layer 18.

Light beams L4 incident on the inclined surface 12b on the side further outside than the light beam L3 are refracted toward the center side of the microlens ML by the lens layer 15, are refracted to the outside with respect to the center of the microlens ML by the lens layer 16 and the lens layer 17, sequentially approach the normal direction, and are emitted from the lens layer 17.

The light beams L2 incident on the inclined surface 12b at the end of the microlens ML are refracted toward the center side of the microlens ML by the lens layer 15. However, the light beams are incident on the inclined surface 12b similar to the light beam L4, and thus are refracted at substantially the same angle as that of the light beam L4. The light beams L2 are refracted to the outside with respect to the center of the microlens ML by the lens layer 16, approach the normal direction, and are emitted from the lens layer 16.

In this manner, in the microlens array substrate 10 according to the first embodiment, the amount of light passing through the opening region of the pixel P can be increased by refracting incident light toward the center side of the microlens ML (the center side of the pixel P) in the first microlens (lens layer 15), and thus it is possible to improve light utilization efficiency in the liquid crystal device 1.

In addition, it is possible to reduce an angle of light, refracted by the first microlens (lens layer 15) and becoming oblique to the normal direction, by the second microlens (lens layer 16), the third microlens (lens layer 17), and the fourth microlens (lens layer 18) and to bring the light close to parallel light. Since the peripheral edge of the concave portion 12 is the inclined surface 12b having a tapered shape, the refraction angle of light incident on the peripheral edge including the end can be made to be substantially equal. Thereby, variations in the angle of the light incident on the liquid crystal layer 40 (see FIG. 3) with respect to the orientation direction of liquid crystal can be reduced, and thus it is possible to improve contrast in the liquid crystal device 1.

In this manner, in the microlens array substrate 10 according to the first embodiment, it is possible to achieve both an improvement in light utilization efficiency and an improvement in contrast as compared with a case where the lens layer 14 is configured as a single layer, satisfactory optical characteristics are obtained even when an optical path length is short. Accordingly, it is possible to reduce the layer thickness of the optical path length adjustment layer 31 as compared with a case where the lens layer 14 is configured as a single layer.

Meanwhile, the contour shapes of the lens layer 18 and the lens layer 17 which are exposed to the surface 14a of the lens layer 14 are a concentrically circular shape which is a virtual external shape (circular shape) of the concave portion 12, and thus it is possible to distribute a region in which angles of light emitted from the microlens ML with respect to the normal direction become substantially the same as each other, in a concentrically circular shape within the opening region of the pixel P.

Incidentally, in a microlens array substrate disclosed in JP-A-2007-226075, a plurality of layers having different refractive indexes, inclusive of the uppermost layer, are laminated across the entire region of a spherical microlens. For this reason, an angle between a tangent of a lens layer (or layers constituting a lens layer) and the surface of a substrate becomes larger at the end of the microlens. Accordingly, incident light is refracted by an interface between the layers having different refractive indexes, and thus there is a concern of light utilization efficiency being decreased by that amount.

On the other hand, in the microlens array substrate 10 according to the first embodiment, the number of lens layers laminated toward the end from the central portion of the microlens ML is reduced, and thus the reflection from an interface between layers having different refractive indexes is reduced. In addition, since the peripheral edge (end) of the microlens ML (concave portion 12) is formed as the inclined surface 12b, an angle between the tangent of the lens layer at the end and the surface of the substrate becomes smaller, as compared tih a spherical microlens. Accordingly, reflection by an interface between layers having different refractive indexes is not likely to occur, and it is possible to reduce variations in the angle of refracted light with respect to the normal direction.

Thereby, it is possible to improve light utilization efficiency and contrast in the liquid crystal device 1 as compared with the microlens array substrate disclosed in JP-A-2007-226075. In addition, since the diffusion of light emitted from the liquid crystal device 1 is suppressed, it is possible to suppress the vignetting of light incident on a projection lens when the liquid crystal device 1 is used as a liquid crystal light valve of a projector and to improve improvements in light utilization efficiency and contrast in the projector.

Method of Manufacturing Microlens Array Substrate

Next, a method of manufacturing the microlens array substrate 10 according to the first embodiment will be described. FIGS. 6A to 6D and FIGS. 7A to 7C are schematic cross-sectional views illustrating a method of manufacturing the microlens array substrate according to the first embodiment. In detail, the drawings of FIGS. 6A to 6D and FIGS. 7A to 7C are equivalent to schematic cross-sectional views taken along line V-V of FIG. 4 similar to FIG. 5, but the vertical direction (Z-direction) thereof is reverse to that in FIG. 5.

Figure 6A:
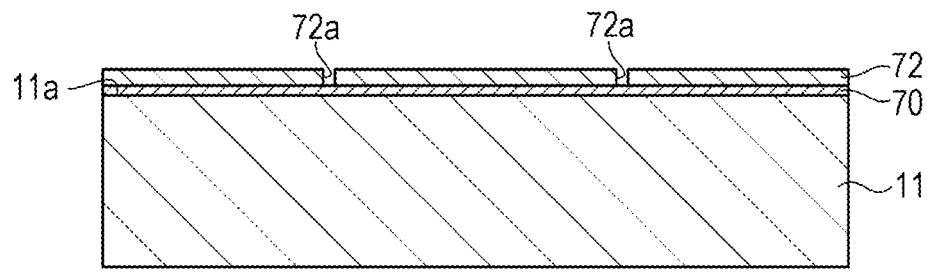
FIGS. 6A to 6D are schematic cross-sectional views illustrating a method of manufacturing the microlens array substrate according to the first embodiment.

As illustrated in FIG. 6A, a control film 70 constituted by an oxide film such as, for example, $SiO_2$ is formed on the surface 11a of the light transmissive substrate 11 formed of quartz. The control film 70 has an etching rate in isotropic etching which is different from that of the substrate 11, and has a function of adjusting an etching rate in the width direction (the X-direction, the Y-direction, and the diagonal direction illustrated in FIG. 4) with respect to an etching rate in the depth direction (Z-direction) at the time of forming the concave portion 12.

After the control film 70 is formed, the annealing of the control film 70 is performed at a predetermined temperature. The etching rate of the control film 70 is changed by the temperature during the annealing. Therefore, it is possible to adjust the etching rate of the control film 70 by appropriately setting the temperature during the annealing.

Next, a mask layer 72 is formed on the control film 70. Then, an opening 72a is formed in the mask layer 72 by patterning the mask layer 72. The planar shape of the opening 72a is, for example, a circular shape. The planar center position of the opening 72a is equivalent to the center position in the external shape of the concave portion 12 formed. Subsequently, isotropic etching is performed on the substrate 11 covered with the control film 70 through the opening 72a of the mask layer 72.

Figure 6B:
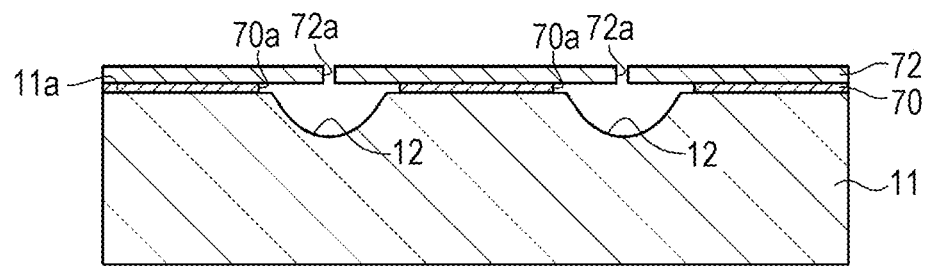

As illustrated in FIG. 6B, an opening 70a is formed in a region overlapping the opening 72a of the control film 70 by the isotropic etching, and the substrate 11 is etched through the opening 70a, thereby forming the concave portion 12. An etchant (for example, a hydrofluoric acid solution) capable of making the etching rate of the control film 70 larger than the etching rate of the substrate 11 is used for the isotropic etching. Thereby, an etching amount of the control film 70 per unit time is larger than an etching amount of the substrate 11 per unit time, and thus an etching amount of the substrate 11 in the width direction becomes larger than an etching amount thereof in the depth direction with an increase in the size of the opening 70a.

Figure 6C:
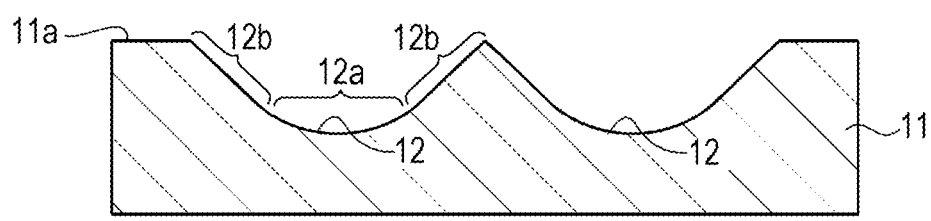

As illustrated in FIG. 6C, the concave portion 12 in the width direction becomes larger than the concave portion in the depth direction, and thus the curved surface portion 12a is formed in the central portion, and the tapered inclined surface 12b is formed in the peripheral edge. Meanwhile, FIG. 6C illustrates a state where the mask layer 72 and the control film 70 are removed after the isotropic etching is terminated.

Meanwhile, in this process, the isotropic etching is terminated in a state where the concave portions 12 adjacent to each other in the X-direction and the Y-direction are connected to each other and the concave portions 12 adjacent to each other in the diagonal direction are separated from each other (see FIG. 4). When the isotropic etching is performed until the concave portions 12 adjacent to each other in the diagonal direction are connected to each other, there is a concern of the mask layer 72 being floated from the substrate 11 and peeling off. In the present embodiment, since the isotropic etching is terminated in a state where the surface 11a of the substrate 11 remains between the concave portions 12 adjacent to each other, it is possible to support the mask layer 72 until the isotropic etching is terminated. Thereby, the diameter of the concave portion 12 when seen in a plan view becomes smaller than the length of the diagonal line of the pixel P.

Figure 6D:
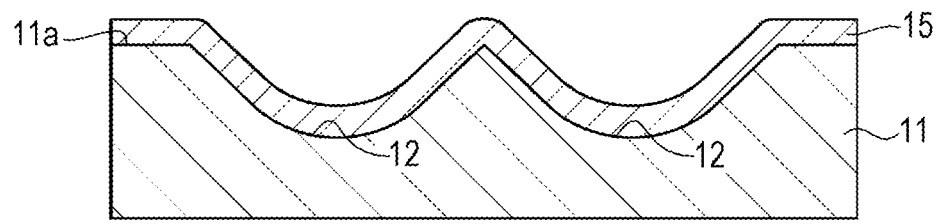
Figure 7A:
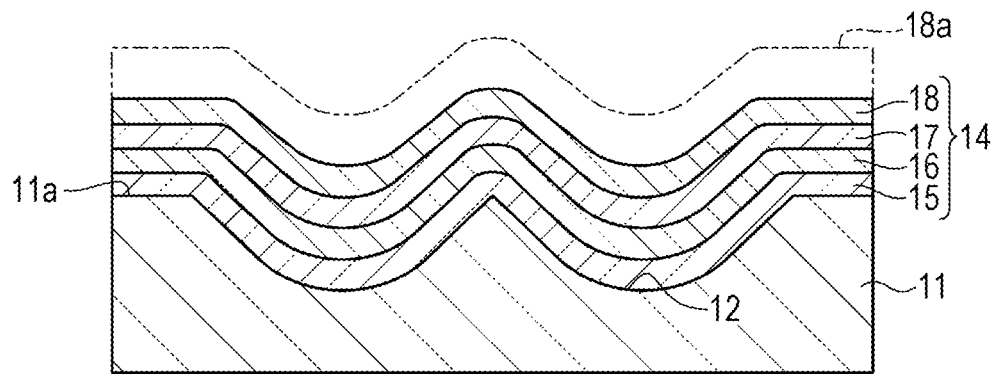
FIGS. 7A to 7C are schematic cross-sectional views illustrating a method of manufacturing the microlens array substrate according to the first embodiment.

Next, a process of forming a lens layer illustrated in FIGS. 6D and 7A is performed. First, as illustrated in FIG. 6D, the lens layer 15 is formed by depositing an inorganic material having light transmittance and a light refractive index larger than that of the substrate 11 so as to cover the surface 11a side of the substrate 11. The lens layer 15 can be formed using, for example, a CVD method. The shape of the concave portion 12 of the substrate 11 is reflected in the surface of the lens layer 15.

Subsequently, as illustrated in FIG. 7A, the lens layer 16, the lens layer 17, and the lens layer 18 are sequentially formed on the lens layer 15. The lens layer 16, the lens layer 17, and the lens layer 18 are formed by sequentially depositing an inorganic material, having light transmittance and a light refractive index larger than that of the substrate 11 and smaller than that of the lens layer 15, so as to have the same thickness as that of the lens layer 15. The lens layer 14 is constituted by four laminated lens layers of the lens layer 15 to the lens layer 18. The shape of the concave portion 12 of the substrate 11 is also reflected in the surface of the lens layer 18 serving as the uppermost layer of the lens layer 14.

In this manner, the lens layer 14 is constituted by a plurality of layers laminated, and thus it is possible to easily adjust the layer thickness of the lens layer 14 by appropriately changing the number of lens layers laminated. In addition, it is possible to easily adjust optical characteristics of the lens layer 14 which affect light utilization efficiency and contrast by appropriately changing the light refractive index each of the laminated lens layers. Meanwhile, in FIG. 7A, the position of a surface 18a of the lens layer 18 in a case where the lens layer 18 is formed to have a layer thickness equal to or larger than the depth of the concave portion reflected in the surface of the lens layer 17 is shown by a two-dot chain line.

Figure 7B:
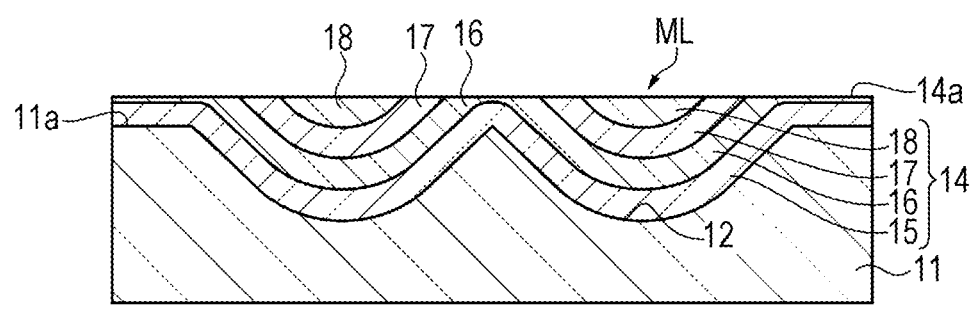

Next, as illustrated in FIG. 7B, a flattening process of performing flattening on the lens layer 14 is performed. In the flattening process, irregularities formed in the upper surface of the lens layer 14 are removed by being polished using, for example, a chemical mechanical polishing (CMP) process. In the present embodiment, the flattening is performed within a range in which the lens layer 15 which is the lowermost layer is not exposed, that is, within a range of the total thickness ranging from the lens layer 16 to the lens layer 18.

Thereby, the surface 14a of the lens layer 14 is flattened, and the lens layer 16, the lens layer 17, and the lens layer 18 are exposed to the surface 14a. Then, a material of the lens layer 14 (four lens layer of the lens layer 15 to the lens layer 18) is filled in the concave portion 12, thereby configuring the microlens ML.

Meanwhile, although not shown in the drawing, a mark serving as a reference of the position at the time of forming the concave portion 12 and a mark serving as a reference of positioning at the time of bonding the element substrate 20 and the counter substrate 30 together may be formed on the surface 11a of the substrate 11 in advance. When such marks are formed, flattening is performed in a range in which the lens layer 15 which is the lowermost layer is not exposed, and thus it is possible to suppress the polishing and removal of the marks in the flattening process.

Figure 7C:
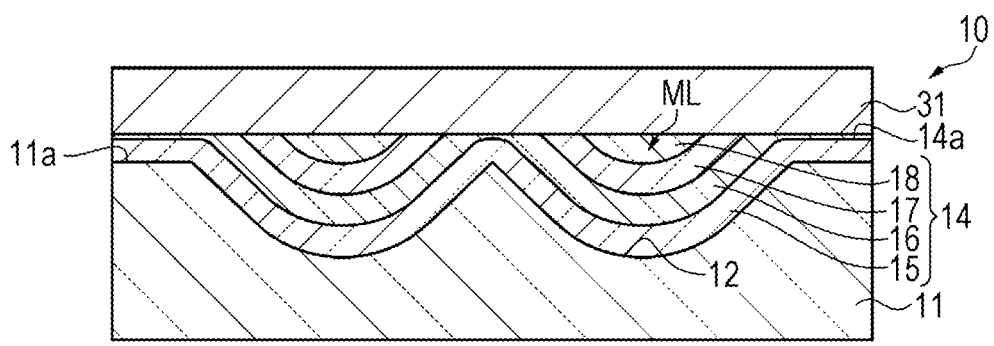

Next, as illustrated in FIG. 7C, the optical path length adjustment layer 31 is formed by depositing an inorganic material, having light transmittance and a light refractive index of the same level as that of, for example, the substrate 11, so as to cover the surface 14a of the lens layer 14. In this manner, the manufacture of the microlens array substrate 10 is completed.

Here, as in the microlens array substrate disclosed in JP-A-2007-226075, when there is an attempt to flatten the surface of the lens layer 14 within a range of the layer thickness of the lens layer 18 which is the uppermost layer (without exposing the lens layer 17 located just below the lens layer 18, and the layers located thereunder) in the flattening process, it is necessary to form the lens layer 18 to be thick in the lens layer forming process. That is, as shown by the two-dot chain line in FIG. 7A, it is necessary to form the lens layer 18 so as to have at least a layer thickness equal to or larger than the depth of the concave portion reflected in the surface of the lens layer 17.

Meanwhile, when a plurality of layers are laminated and deposited, a small pitch of the pixel P (small diameter of the concave portion 12) makes an amount of deposition in a convex portion between the concave portions 12 larger than an amount of deposition within a concave portion, which may result in an increase in the step between the concave and convex portions. In this case, the lens layer 18 which is the uppermost layer has to be formed to have a larger layer thickness.

In addition, as in the microlens array substrate disclosed in JP-A-2007-226075, when the lens layer 18 which is the uppermost layer also functions as an optical path length adjustment layer, the residual thickness of the lens layer 18 has to be adjusted to a layer thickness capable of obtaining a desired optical path length while flattening the surface of the lens layer 18 in the flattening process. For this reason, both the flatness of the surface and a predetermined layer thickness (residual thickness) have to be secured, and thus there is a problem in that it is not possible to easily adjust the optical path length.

On the other hand, in the present embodiment, since the flattening is performed in a range in which the lens layer 15 which is the lowermost layer is not exposed, the lens layer 18 which is the uppermost layer is not required to be thicker than the depth of the concave portion reflected in the surface of the lens layer 17 located just below the lens layer 18, and can be formed to have a layer thickness of the same level as those of the lens layer 15, the lens layer 16, and the lens layer 17. Thereby, it is possible to reduce the number of processes in the lens layer forming process, as compared with the microlens array substrate disclosed in JP-A-2007-226075. In addition, since the optical path length ranging from the microlens ML to the light shielding layer 26 is adjusted by the layer thickness of the optical path length adjustment layer 31, it is possible to easily adjust the optical path length to a desired optical path length.

Second Embodiment

Microlens Array Substrate

A microlens array substrate according to a second embodiment is different from that in the first embodiment in terms of the configuration of a lens layer. The configuration of a microlens array substrate 10A according to the second embodiment will be described below with reference to FIGS. 8 and 9. FIG. 8 is a schematic plan view illustrating the configuration of the microlens array substrate according to the second embodiment. FIG. 9 is a schematic cross-sectional view illustrating the configuration of the microlens array substrate according to the second embodiment. In detail, FIG. 9 is a schematic cross-sectional view taken along line IX-IX of FIG. 8. Components in common with those in the first embodiment are denoted by the same reference numerals, and the description thereof will be omitted here.

As illustrated in FIG. 9, the microlens array substrate 10A according to the second embodiment includes a substrate 11 provided with a concave portion 12, a lens layer 19 which is provided so as to cover a surface 11a of the substrate 11 by filling the concave portion 12, and an optical path length adjustment layer 31 which is formed so as to cover a surface 19a of the lens layer 19.

The lens layer 19 according to the second embodiment is constituted by a lens layer 15A as a fourth lens layer, a lens layer 16A as a first lens layer, a lens layer 17 as a second lens layer, and a lens layer 18 as a third lens layer which are sequentially laminated toward the surface 19a from the concave portion 12 side. Accordingly, a microlens ML according to the second embodiment is configured such that four microlenses of a first microlens (lens layer 15A), a second microlens (lens layer 16A), a third microlens (lens layer 17), and a fourth microlens (lens layer 18) are laminated from the concave portion 12 side.

In the lens layer 19 according to the second embodiment, a refractive index of the lens layer 15A is smaller than a refractive index of the lens layer 16A. More specifically, light refractive indexes of the lens layers and the substrate 11 have a relationship of the substrate 11<the lens layer 18<the lens layer 17<the lens layer 15A<the lens layer 16A.

Since the refractive index of the lens layer 16A is larger than the refractive index of the lens layer 15A, the second microlens (lens layer 16A) has a positive refractive power. The fact that the first microlens (lens layer 15A) has a positive refractive power and the third microlens (lens layer 17) and the fourth microlens (lens layer 18) have a negative refractive power is the same as that in the first embodiment.

The lens layer 15A is exposed to the surface 19a of the lens layer 19. The lens layer 19 is obtained by performing flattening until the lens layer 15A which is the lowermost layer exposed in the flattening process illustrated in FIG. 7B. Meanwhile, when a mark serving as a reference of positioning is formed on the surface 11a of the substrate 11, flattening is performed in a range in which a residual thickness of the lens layer 15A is equal to or larger than the thickness of the mark in the flattening process.

As a result, in the lens layer 19 according to the second embodiment, a region in which four layers of the lens layer 15A to the lens layer 18 are laminated, a region in which three layers of the lens layer 15A to the lens layer 17 are laminated, and a region in which two layers of the lens layer 15A and the lens layer 16A are laminated, toward the end from the central portion, and a region in which the lens layer 15A is present are present.

Light beams L2, L3, and L4 incident outward from the center of the microlens ML according to the second embodiment are refracted toward the center side of the microlens ML by the positive refractive power of the first microlens (lens layer 15A), and are further refracted to the center side of the microlens ML by the positive refractive power of the second microlens (lens layer 16A).

Accordingly, the light utilization efficiency in a liquid crystal device 1 is improved by refracting light incident on the microlens ML toward the center side of the microlens ML (center side of a pixel P) by the first microlens (lens layer 15A) and the second microlens (lens layer 16A). In addition, the contrast in the liquid crystal device 1 is improved by reducing an angle of light inclining to a normal direction by the third microlens (lens layer 17) and the fourth microlens (lens layer 18).

As illustrated in FIG. 8, when the microlens array substrate 10A is seen from the optical path length adjustment layer 31 side, the lens layer 18, the lens layer 17, the lens layer 16A, and the lens layer 15A are sequentially exposed to the surface 19a of the lens layer 19 toward the end from the central portion of the concave portion 12 when seen in a plan view. The contour shapes of the lens layer 18, the lens layer 17, and the lens layer 16A are a concentrically circular shape, shown by a two-dot chain line, which is the virtual external shape (circular shape) of the concave portion 12.

In the microlens array substrate 10A according to the second embodiment, similarly to the microlens array substrate 10 according to the first embodiment, it is possible to achieve improvements in light utilization efficiency and contrast. In the second embodiment, since flattening is performed until the lens layer 15A is exposed, it is possible to reduce the layer thickness of the lens layer 19 more than in the first embodiment, and the reflection from an interface between layers having different refractive indexes is further reduced at the end of the microlens ML. Whether to configure the microlens ML in the manner of the first embodiment or in the manner of the second embodiment may be determined on the basis of optical characteristics required for the microlens ML, for example, from the pitch of the pixel P and the configuration of a liquid crystal layer 40.

Meanwhile, in the lens layer 19 according to the second embodiment, similarly to the lens layer 14 according to the first embodiment, a configuration in which the lens layer 15A is not exposed to the surface 19a may be adopted. In addition, in a configuration in which the lens layer 15A is exposed to the surface 19a of the lens layer 19 according to the second embodiment, light refractive indexes of the lens layers may have a relationship of the substrate 11<the lens layer 18<the lens layer 17<the lens layer 16A<the lens layer 15A, similar to the lens layer 14 according to the first embodiment. In this manner, in the invention, it is possible to select an optimal configuration in accordance with optical characteristics required for the microlens ML.

Third Embodiment

Electronic Apparatus

Figure 10:
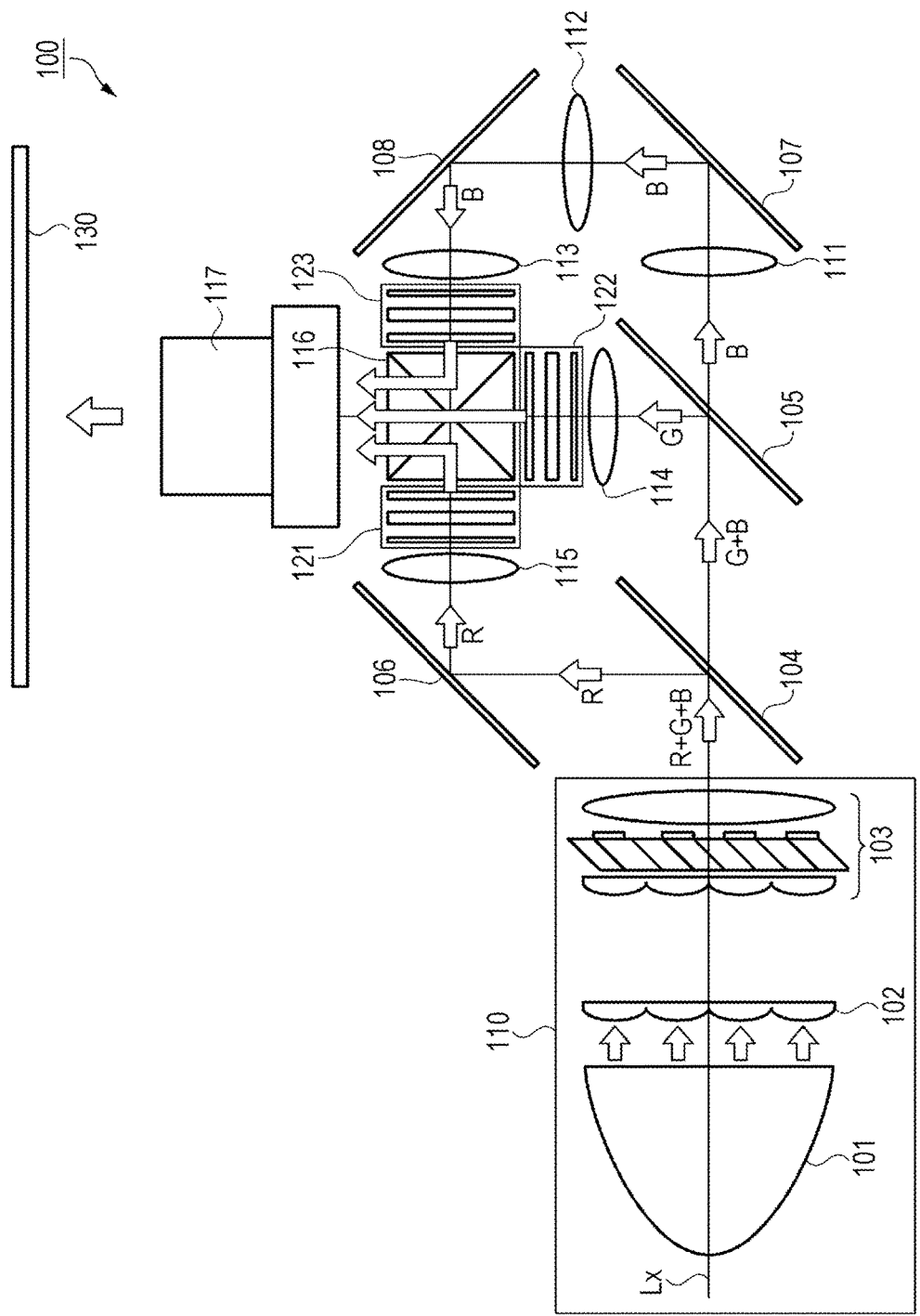
FIG. 10 is a schematic diagram illustrating the configuration of a projector as an electronic apparatus according to a third embodiment.

Next, an electronic apparatus according to a third embodiment will be described with reference to FIG. 10. FIG. 10 is a schematic diagram illustrating the configuration of a projector as an electronic apparatus according to the third embodiment.

As illustrated in FIG. 10, a projector (projection type display device) 100 as an electronic apparatus according to the third embodiment includes a polarized illumination device 110, two dichroic mirrors 104 and 105, three reflecting mirrors 106, 107, and 108, five relay lenses 111, 112, 113, 114, and 115, three liquid crystal light valves 121, 122, and 123, a cross dichroic prism 116, and a projection lens 117.

The polarized illumination device 110 includes a lamp unit 101 as a light source constituted by a white light source such as, for example, an ultra-high pressure mercury lamp or a halogen lamp, an integrator lens 102, and a polarization conversion element 103. The lamp unit 101, the integrator lens 102, and the polarization conversion element 103 are disposed along a system optical axis Lx.

The dichroic mirror 104 reflects red light (R) and transmits green light (G) and blue light (B) in polarized light flux emitted from the polarized illumination device 110. The other dichroic mirror 105 reflects the green light (G) having passed through the dichroic mirror 104 and transmits the blue light (B).

The red light (R) reflected from the dichroic mirror 104 is reflected from the reflecting mirror 106, and is then incident on the liquid crystal light valve 121 through the relay lens 115. The green light (G) reflected from the dichroic mirror 105 is incident on the liquid crystal light valve 122 through the relay lens 114. The blue light (B) having passed through the dichroic mirror 105 is incident on the liquid crystal light valve 123 through a light guide system constituted by the three relay lenses 111, 112, and 113 and two reflecting mirrors 107 and 108.

The transmission type liquid crystal light valves 121, 122, and 123 as optical modulation elements are disposed so as to face an incident surface for each color light of the cross dichroic prism 116. The color light beams incident on the liquid crystal light valves 121, 122, and 123 are modulated on the basis of image information (image signal) and are emitted toward the cross dichroic prism 116.

The cross dichroic prism 116 is formed by bonding four rectangular prisms together and has a dielectric multilayer reflecting red light and a dielectric multilayer reflecting blue light formed in a cross shape on the inner surface thereof. Three color light beams are synthesized by the dielectric multilayers, and thus light representing a color image is synthesized. The synthesized light is projected onto a screen 130 by the projection lens 117 which is a projection optical system, and the image thereof is enlarged and displayed.

The liquid crystal light valve 121 is a value to which the liquid crystal device 1 including the microlens array substrate 10 according to the above-mentioned embodiment or the microlens array substrate 10A. The liquid crystal light valve 121 is disposed with a gap between a pair of polarizing elements disposed in crossed nicols on an incidence side and an emission side of color light. The same is true of the other liquid crystal light valves 122 and 123.

According to the configuration of a projector 100 according to the third embodiment, even when a plurality of pixels P are disposed with high definition, the liquid crystal device 1 capable of achieving bright display and satisfactory contrast is provided, and thus it is possible to provide the projector 100 having bright display and satisfactory contrast.

The above-mentioned embodiment shows just an aspect of the invention, and can be arbitrarily modified and applied within the scope of the invention. For example, the following modification examples can be considered.

Modification Example 1

Figure 11:
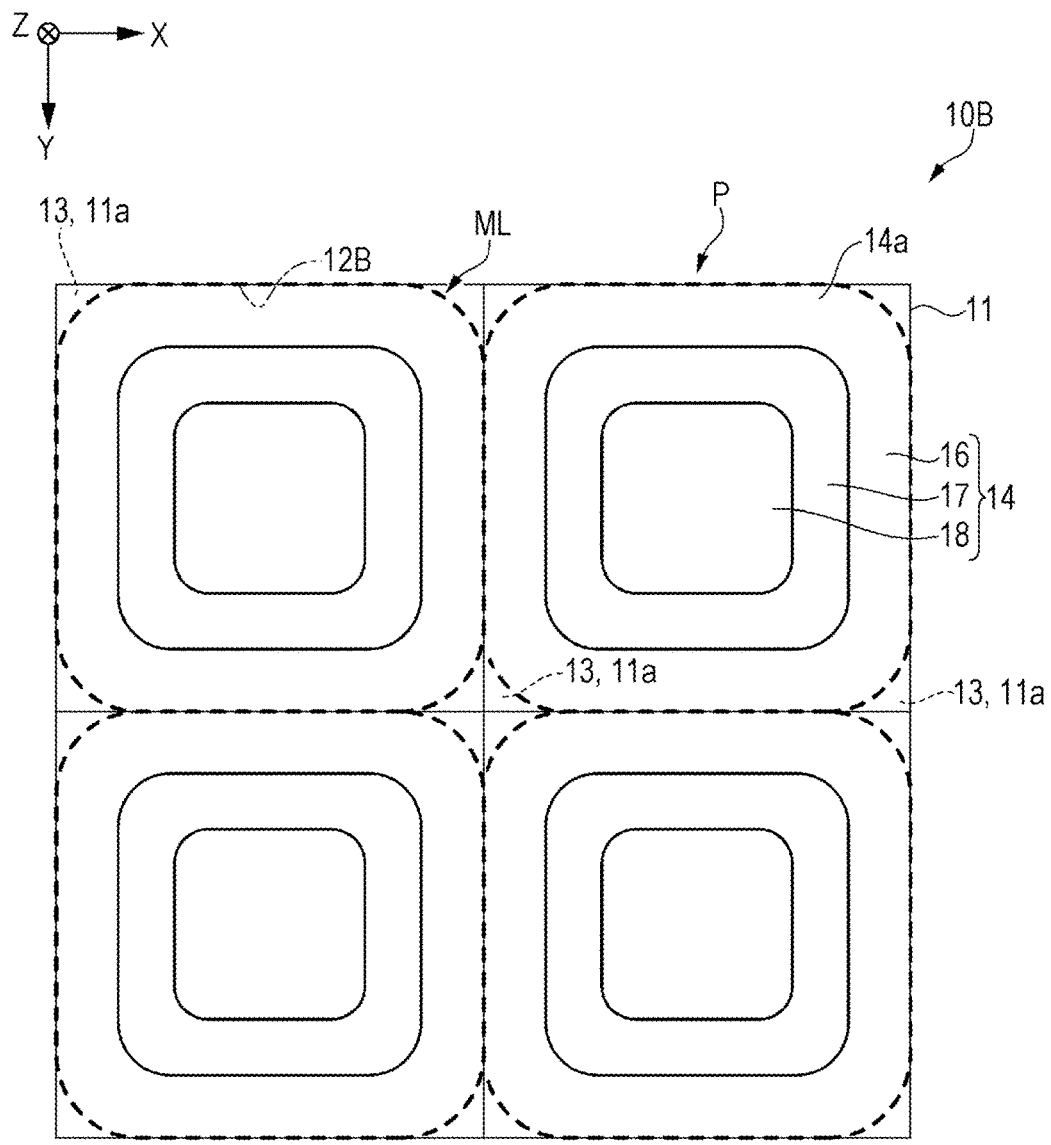
FIG. 11 is a schematic plan view illustrating the configuration of a microlens array substrate according to Modification Example 1.

In the microlens array substrates 10 and 10A according to the above-mentioned embodiments, the virtual external shape of the concave portion 12 is a circular shape, the contour shape of the lens layer 18 and the contour shape of the lens layer 17 (and the contour shape of the lens layer 16A in the microlens array substrate 10A) are configured as the concentrically circular shape of the external shape (circular shape) of the concave portion 12, but the invention is not limited thereto. For example, the virtual external shape of the concave portion may be a substantially rectangular shape. FIG. 11 is a schematic plan view illustrating the configuration of a microlens array substrate according to Modification Example 1. Components in common with those in the above-mentioned embodiments are denoted by the same reference numerals, and the description thereof will be omitted here.

As illustrated in FIG. 11, the external shape of a concave portion 12B provided in the substrate 11 of a microlens array substrate 10B according to Modification Example 1 is a substantially rectangular shape when seen in a plan view. Four sides of the concave portion 12B are inscribed in a pixel P, and four corner portions of the concave portion 12B are formed to be round. Accordingly, the concave portions 12B adjacent to each other in the X-direction and the Y-direction are connected to each other, and the concave portions 12B adjacent to each other in the diagonal direction of the pixel P are separated from each other.

The concave portion 12B having a substantially rectangular external shape when seen in a plan view can be formed by forming the opening 72a in a rectangular planar shape in the process of patterning the mask layer 72 to form the opening 72a illustrated in FIG. 6A. That is, in the process of performing isotropic etching illustrated in FIGS. 6B and 6C, the concave portion 12B having a substantially rectangular external shape corresponding to the opening 72a is formed, and the substantially rectangular external shape is enlarged in association with the progress of etching, thereby obtaining the concave portion 12B having a substantially rectangular external shape illustrated in FIG. 11. Meanwhile, although not shown in the drawing, similarly to the concave portion 12 according to the above-mentioned embodiments, the cross-sectional shape of the concave portion 12B may be a shape having a curved surface portion 12a and an inclined surface 12b, or may be a shape having a flat bottom in the middle of the curved surface portion.

In addition, as illustrated in FIG. 11, a lens layer 16, a lens layer 17, and a lens layer 18 are exposed to a surface 14a of a lens layer 14. A lens layer 15 (not shown) is covered with the lens layer 16, the lens layer 17, and the lens layer 18. The contour shape of the lens layer 18 and the contour shape of the lens layer 17 which are exposed to the surface 14a of the lens layer 14 have a portion along four sides of the concave portion 12B substantially in parallel, and are rectangular shapes which are substantially similar to the external shape of the concave portion 12B. Thereby, it is possible to distribute a region in which inclinations of light emitted from the microlens ML with respect to a normal direction of the surface of a substrate become substantially the same as each other, along the contour shapes of the lens layer 18 and the lens layer 17.

Meanwhile, as in the second embodiment, when layers up to the lens layer 15 are exposed to the surface 14a of the lens layer 14, the contour shape of the lens layer 16 also has a portion which is substantially parallel to four sides of the concave portion 12B, and thus becomes a rectangular shape which is substantially similar to the external shape of the concave portion 12B.

As the contour shapes (concentrically circular shapes or substantially similar rectangular shapes) of the lens layers, a shape capable of making a greater amount of light incident on the inside of an opening region of the pixel P or a shape capable of uniformizing the distribution of brightness within the opening region of the pixel P is selected, for example, in accordance with the shapes of openings 22a and 26a of light shielding layers 22 and 26 specifying the opening region of the pixel P.

Modification Example 2

In the microlens array substrates 10 and 10A according to the above-mentioned embodiments, the lens layers 14 and 19 have a configuration in which four lens layers are laminated, but the invention is not limited thereto. The lens layers 14 and 19 may have a configuration in which three lens layers are laminated or five or more lens layers are laminated. In addition, a configuration may be adopted in which a lens layer serving as the lowermost layer is not exposed to the surfaces 14a and 19a of the lens layers 14 and 19 as in the first embodiment, or a configuration may be adopted in which the lens layer serving as the lowermost layer is exposed to the surfaces 14a and 19a of the lens layers 14 and 19 as in the second embodiment, regardless of the number of lens layers laminated. Further, a configuration may be adopted in which the light refractive index of the lens layer serving as the lowermost layer is larger as in the first embodiment or is smaller as in the second embodiment with respect to the light refractive index of the lens layer located just above the lowermost layer. With either of the configurations, it is possible to achieve improvements in light utilization efficiency and contrast in the liquid crystal device 1.

Modification Example 3

In the microlens array substrates 10 and 10A according to the above-mentioned embodiments, a configuration in which the peripheral edge of the concave portion 12 is provided with the inclined surface 12b, but the invention is not limited thereto. For example, the entire concave portion 12 may be constituted by a curved surface portion instead of providing the inclined surface 12b in the peripheral edge of the concave portion 12. However, as in the above-mentioned embodiments, a configuration in which the peripheral edge of the concave portion 12 is provided with the inclined surface 12b is preferably adopted in that the reflection from an interface between layers having different refractive indexes is not likely to occur at the end and that it is possible to reduce an angle of refracted light with respect to a normal direction.

Modification Example 4

In a method of manufacturing the liquid crystal device according to the above-mentioned embodiment, a configuration is adopted in which a difference between etching rates in a width direction and a depth direction is controlled in a process of performing isotropic etching by providing the control film 70 to thereby form the concave portion 12 having the inclined surface 12b, but the invention is not limited thereto. For example, a configuration may be adopted in which a resist layer is formed on the substrate 11, the resist layer is formed to have a shape as a base of the concave portion 12 by exposure or multi-step exposure using a grayscale mask, and the shape of the concave portion 12 is transferred to the substrate 11 and is formed by performing anisotropic etching on the resist layer and the substrate 11 at substantially the same etching selection ratio. Meanwhile, in this case, the control film 70 is not necessary.

Modification Example 5

An electronic apparatus to which the liquid crystal device 1 according to the above-mentioned embodiment can be applied is not limited to the projector 100. The liquid crystal device 1 can be preferably used as a display unit of an information terminal device such as, for example, a projection type head up display (HUD), a direct-view type head mounted display (HMD), an e-book, a personal computer, a digital still camera, a liquid crystal television, a viewfinder type or monitor direct-view type video recorder, a car navigation system, an electronic organizer, or a POS.

What is claimed is:
1. A lens array substrate comprising:
a substrate which has a concave portion provided in a first face thereof; and
a lens layer, having a substantially flat surface, which is provided so as to cover the first face and fill the concave portion,
wherein
the lens layer includes a first layer and a second layer which are sequentially laminated from a substrate side by reflecting a shape of the concave portion therein, a refractive index of the first layer is different from a refractive index of the second layer, the second layer, the first layer, and the second layer are sequentially exposed to the surface of the lens layer in this order in a first direction when seen in a plan view, and the second layer, the first layer, the substrate, the first layer, and the second layer are sequentially exposed to the surface of the lens layer in this order in a second direction that intersects the first direction when seen in a plan view.

2. The lens array substrate according to claim 1, the refractive index of the first layer is larger than the refractive index of the second layer.

3. The lens array substrate according to claim 1, wherein the lens layer further includes a third layer which is disposed on the second layer, and wherein a refractive index of the third layer is smaller than the refractive index of the first layer.

4. The lens array substrate according to claim 1, wherein the lens layer further includes a fourth layer which is disposed closer to the substrate side than to the first layer, and wherein a refractive index of the fourth layer is smaller than the refractive index of the first layer, and the refractive index of the fourth layer is larger than the refractive index of the second layer.

5. The lens array substrate according to claim 2, wherein the third layer, the second layer, the first layer, and the fourth layer are sequentially exposed to the surface of the lens layer in this order toward an end of the concave portion from a central portion of the concave portion.

6. The lens array substrate according to claim 1, wherein a contour shape of the third layer in the surface of the lens layer and a contour shape of the second layer in the surface of the lens layer define a concentrically circular shape with a center position of the concave portion, when seen in the plan view, as a center of the concentrically circular shape.

7. The lens array substrate according to claim 1, wherein an external shape of the concave portion, when seen in the plan view, has a linear portion, and a contour shape of the third layer in the surface of the lens layer and a contour shape of the second layer in the surface of the lens layer have a portion along the linear portion.

8. The lens array substrate according to claim 1, further comprising a light-transmitting layer that is provided so as to cover the surface of the lens layer, the light-transmitting layer having a refractive index that is smaller than a refractive index of the lens layer.

9. The lens array substrate according to claim 1, wherein an end of the concave portion is formed as an inclined surface which is inclined toward a central portion of the concave portion from the first face when seen in a cross-sectional view.

10. A lens array substrate comprising:
a substrate; and
a first lens, a second lens, and a third lens that are each disposed on the substrate, the second lens being disposed adjacent to the first lens in a first direction and the third lens being disposed adjacent to the first lens in a second direction which obliquely intersects the first direction;

wherein
the first lens includes a first layer and a second layer which is disposed between the first layer and the substrate, a surface of the lens array substrate has a substantially flat surface, the substrate, the first layer, and the second layer are exposed to the surface of the lens array substrate, the second layer, the first layer, and the second layer are sequentially exposed to the surface of the lens array substrate in this order between a center of the first lens and a center of the second lens, and the second layer, the first layer, the substrate, the first layer, and the second layer are sequentially exposed to the surface of the lens array substrate in this order between the center of the first lens and a center of the third lens.

11. The lens array substrate according to claim 10, wherein a refractive index of the first layer is different from a refractive index of the second layer.

12. The lens array substrate according to claim 10, wherein a refractive index of the first layer is larger than a refractive index of the second layer.

13. The lens array substrate according to claim 10, wherein
the surface of the lens array substrate has a concave portion, and
the first layer and the second layer reflect a shape of the concave portion.

14. An electro-optical device, comprising:
the lens array substrate according to claim 10; and
an opposite substrate which is disposed so as to face the lens array substrate; and
an electro-optical layer which is disposed between the lens array substrate and the opposite substrate.

15. An electronic apparatus comprising the electro-optical device according to claim 14.

* * * * *